(12) United States Patent
Wu et al.

(10) Patent No.: US 11,092,713 B2
(45) Date of Patent: Aug. 17, 2021

(54) COMPENSATED AZIMUTHALLY INVARIANT ELECTROMAGNETIC LOGGING MEASUREMENTS

(71) Applicant: Schlumberger Technology Corporation, Sugar Land, TX (US)

(72) Inventors: Peter T. Wu, Missouri City, TX (US); Mark T. Frey, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/773,818

(22) PCT Filed: Oct. 14, 2016

(86) PCT No.: PCT/US2016/056940
§ 371 (c)(1),
(2) Date: May 4, 2018

(87) PCT Pub. No.: WO2017/078915
PCT Pub. Date: May 11, 2017

(65) Prior Publication Data
US 2018/0321414 A1 Nov. 8, 2018

Related U.S. Application Data

(60) Provisional application No. 62/250,651, filed on Nov. 4, 2015.

(51) Int. Cl.
*G01V 3/38* (2006.01)
*G01V 3/30* (2006.01)
(Continued)

(52) U.S. Cl.
CPC .................. *G01V 3/30* (2013.01); *G01V 3/18* (2013.01); *G01V 3/26* (2013.01); *G01V 3/38* (2013.01)

(58) Field of Classification Search
CPC ..... G01V 3/38; G01V 3/30; G01V 1/50; G01V 11/002; G01V 1/48
See application file for complete search history.

(56) References Cited

U.S. PATENT DOCUMENTS 5,682,099 A 10/1997 Thompson et al.
5,811,973 A 9/1998 Meyer, Jr.
(Continued)

FOREIGN PATENT DOCUMENTS

CN 103352696 A 10/2013
CN 204163719 U 2/2015
(Continued)

OTHER PUBLICATIONS

International Search Report and Written Opinion issued in International Patent application PCT/US2016/056940, dated Jan. 24, 2017. 16 pages.

(Continued)

*Primary Examiner* — Alesa Allgood

(57) ABSTRACT

A method for making downhole electromagnetic logging measurements of a subterranean formation is disclosed. An electromagnetic logging tool is rotated in a subterranean wellbore. The tool includes a transmitter axially spaced apart from a receiver. The transmitter may include an axial transmitting antenna and at least one transverse transmitting antenna and the receiver may include an axial receiving antenna and at least one transverse receiving antenna. The transmitting antennas transmit corresponding electromagnetic waves into the subterranean wellbore. The receiving antennas receive corresponding voltage measurements which are processed to compute harmonic voltage coefficients. Ratios of the selected harmonic voltage coefficients are processed to compute gain compensated, azimuthally invariant measurement quantities.

16 Claims, 11 Drawing Sheets

(51) Int. Cl.
*G01V 3/26* (2006.01)
*G01V 3/18* (2006.01)

(56) References Cited

U.S. PATENT DOCUMENTS

| | | |
|---|---|---|
| 6,957,572 B1 | 10/2005 | Wu |
| 7,863,901 B2 | 1/2011 | Seleznev et al. |
| 7,991,555 B2 | 8/2011 | Yang et al. |
| 8,433,518 B2 | 4/2013 | Omeragic et al. |
| 8,466,683 B2 | 6/2013 | Legendre et al. |
| 8,736,271 B2 | 5/2014 | Dion et al. |
| 9,448,324 B2 | 9/2016 | Frey |
| 9,541,666 B2 | 1/2017 | Frey |
| 9,581,721 B2 | 2/2017 | Frey |
| 9,618,647 B2 | 4/2017 | Frey |
| 9,784,880 B2 | 10/2017 | Frey |
| 9,804,292 B2 | 10/2017 | Bertrand et al. |
| 9,933,541 B2 | 4/2018 | Yang |
| 10,302,805 B2 | 5/2019 | Frey |
| 10,371,781 B2 | 8/2019 | Homan et al. |
| 2005/0012036 A1 | 1/2005 | Tubel et al. |
| 2010/0127708 A1 | 5/2010 | Bittar |
| 2010/0305862 A1 | 12/2010 | Li |
| 2011/0074427 A1 | 3/2011 | Wang et al. |
| 2011/0166842 A1 | 7/2011 | Banning-Geertsma et al. |
| 2011/0238312 A1 | 9/2011 | Seydoux et al. |
| 2011/0291855 A1 | 12/2011 | Homan et al. |
| 2011/0309833 A1 | 12/2011 | Yang |
| 2013/0073206 A1* | 3/2013 | Hou .................. G01V 3/28 702/7 |
| 2015/0276967 A1 | 10/2015 | Frey |
| 2015/0276968 A1 | 10/2015 | Frey |
| 2015/0276973 A1* | 10/2015 | Frey .................. G01V 3/38 702/7 |
| 2017/0075024 A1 | 3/2017 | Wu et al. |
| 2018/0321414 A1 | 11/2018 | Wu et al. |

FOREIGN PATENT DOCUMENTS

| | | |
|---|---|---|
| WO | WO2008137987 A1 | 11/2008 |
| WO | 2010134845 A1 | 11/2010 |
| WO | WO2014011190 A1 | 1/2014 |
| WO | WO2015027002 A1 | 2/2015 |
| WO | WO2015027010 A1 | 2/2015 |

OTHER PUBLICATIONS

International Search Report and Written Opinion issued in International Patent application PCT/US2016/056945, dated Oct. 16, 2014. 14 pages.
First Office Action and Search Report issued in Chinese Patent Application 201680066656.0 dated Jul. 25, 2019, 17 pages.
Office Action issued in U.S. Appl. No. 15/773,638 dated Aug. 19, 2019, 12 pages.
Second Office Action and Search Report issued in Chinese Patent Application 201680066656.0 dated Jun. 8, 2020, 9 pages.
Gooneratne et al., Downhole Applications of Magnetic Sensors, Sensors 2017 (Oct. 19, 2017), 17, 2384; doi:10.3390/s17102384 (32 pages).
First Office Action and Search Report issued in Chinese Patent Application 201680069118.7 dated Mar. 15, 2021, 21 pages with English translation.

* cited by examiner

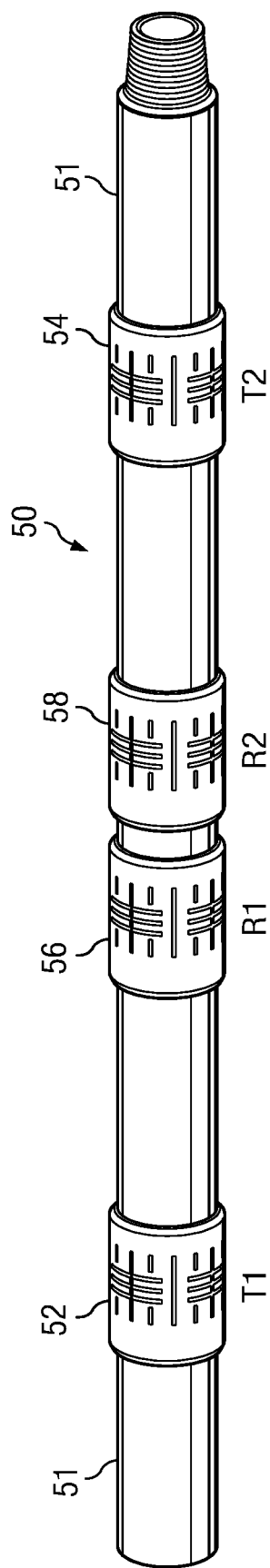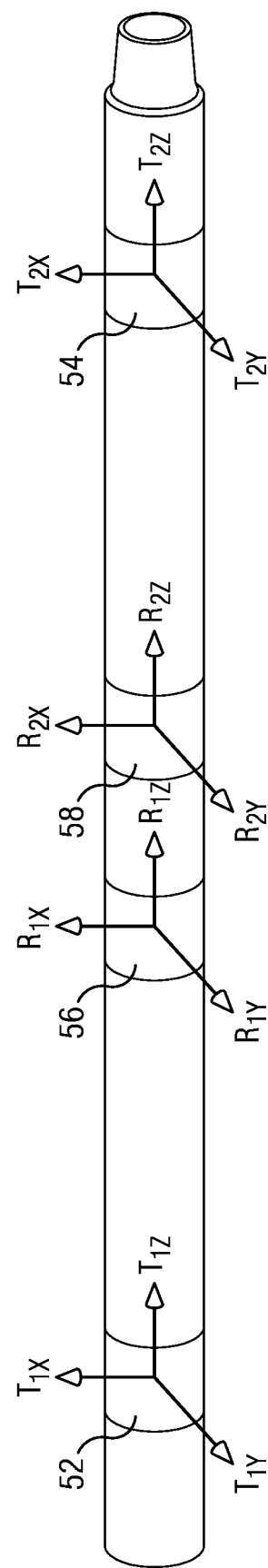

COMPENSATED AZIMUTHALLY INVARIANT ELECTROMAGNETIC LOGGING MEASUREMENTS

CROSS REFERENCE TO RELATED APPLICATIONS

The present application is the U.S. national phase of International Patent Application No. PCT/US2016/056940, filed Oct. 14, 2016, and entitled "Compensated Azimuthally Invariant Electromagnetic Logging Measurements," which claims priority to U.S. Provisional Application 62/250,651 filed Nov. 4, 2015, the entirety of which is incorporated by reference.

FIELD OF THE INVENTION

Disclosed embodiments relate generally to downhole electromagnetic logging methods and more particularly to a logging tool and methods for obtaining fully gain compensated azimuthally invariant electromagnetic logging measurements.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation.

While the use of azimuthally sensitive directional resistivity measurements may provide valuable information upon which steering decisions may be made (e.g., in a pay-zone steering operation), obtaining accurate formation properties can be challenging owing to the azimuthal dependence of the measurements. This problem can be further compounded by transmitter and receiver gains and gain mismatch which vary with downhole pressure and temperature and can influenced by the mechanical shocks and vibration inherent in the drilling environment.

There are currently no known methods for providing fully gain compensated, azimuthally invariant, tri-axial propagation measurements.

SUMMARY

A method for making downhole electromagnetic logging measurements of a subterranean formation is disclosed. An electromagnetic logging tool is rotated in a subterranean wellbore. The tool includes a transmitter axially spaced apart from a receiver. The transmitter may include an axial transmitting antenna and at least one transverse transmitting antenna and the receiver may include an axial receiving antenna and at least one transverse receiving antenna. The transmitting antennas transmit corresponding electromagnetic waves into the subterranean wellbore. The receiving antennas receive corresponding voltage measurements which are processed to compute harmonic voltage coefficients. Ratios of the selected harmonic voltage coefficients are processed to compute gain compensated, azimuthally invariant measurement quantities.

In an alternative embodiment an eccentered (off centered) electromagnetic logging tool is rotated in the subterranean wellbore. The transmitting and receiving antennas are used to transmit electromagnetic wave and receive corresponding voltages as described in the preceding paragraph. Combinations of the received voltage measurements are processed to compute combined measurement quantities, ratios of which are in turn further processed to compute the gain compensated, azimuthally invariant measurement quantities.

The disclosed embodiments may provide various technical advantages. For example, the disclosed methodology may be used to provide gain compensated azimuthally invariant measurement quantities. The properties of such compensated measurements generally depend only on other formation properties, such as horizontal and vertical conductivities (resistivities) and the relative dip angle. For the purpose of inverting for the formation properties, using azimuthal invariant measurements may greatly enhance the robustness of the inversion process.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIG. 2A depicts one example of the electromagnetic logging tool shown on FIG. 1.

FIG. 2B schematically depicts the antenna moments in an electromagnetic logging tool including triaxial transmitters and receivers.

DETAILED DESCRIPTION

Figure 1:
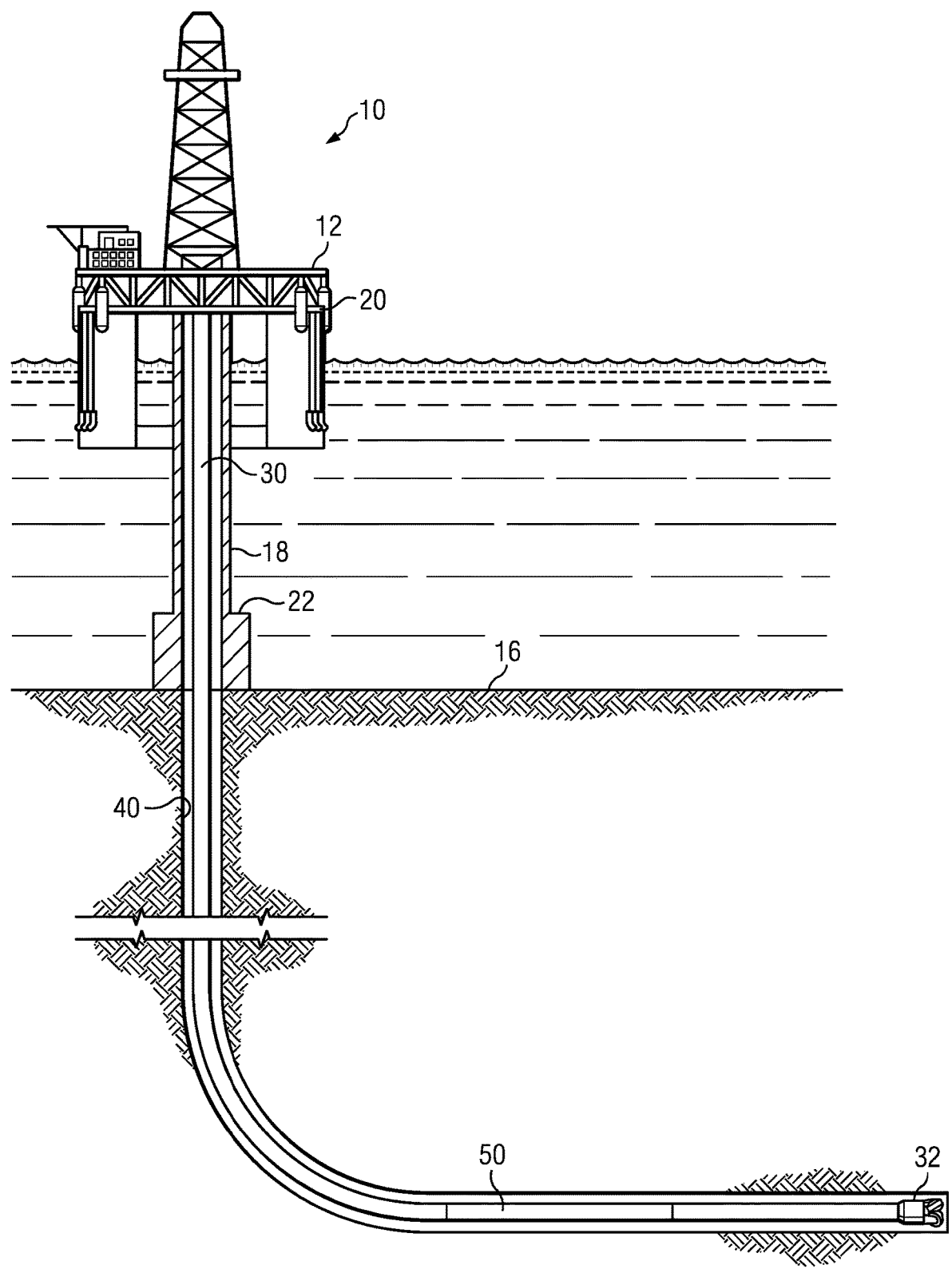
FIG. 1 depicts one example of a drilling rig on which the disclosed electromagnetic logging methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes an electromagnetic measurement tool 50 configured to make directional electromagnetic logging measurements. As described in more detail below the electromagnetic measurement tool 50 may include multi-axial antennas deployed on a logging while drilling tool body.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

FIG. 2A depicts one example of an electromagnetic measurement tool 50. In the depicted embodiment measurement tool 50 includes first and second axially spaced transmitters 52 and 54 and first and second axially spaced receivers 56 and 58 deployed on a logging while drilling tool body 51, with the receivers 56 and 58 being deployed axially between the transmitters 52 and 54. As described in more detail below, each of the transmitters 52 and 54 and receivers 56 and 58 includes at least one transverse antenna and may further include an axial antenna. For example, the transmitters and receivers may include a bi-axial antenna arrangement including an axial antenna and a transverse (cross-axial) antenna. In another embodiment, the transmitters and receivers may include a tri-axial antenna arrangement including an axial antenna and first and second transverse antennas that are orthogonal to one another. As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

FIG. 2B depicts the moments (magnetic dipoles) of one embodiment of measurement tool 50 in which the transmitters 52, 54 and receivers 56, 58 each include a tri-axial antenna arrangement. Each of the transmitters 52, 54 includes an axial transmitting antenna $T1_z$ and $T2_z$ and first and second transverse transmitting antennas $T1_x$, $T1_y$ and $T2_x$, $T2_y$. Likewise, each of the receivers 56, 58 includes an axial receiving antenna $R1_z$ and $R2_z$ and first and second transverse receiving antennas $R1_x$, $R1_y$ and $R2_x$, $R2_y$. It will be understood that the disclosed embodiments are not limited to a tri-axial antenna configuration such as that depicted on FIG. 2B.

Figure 2C:
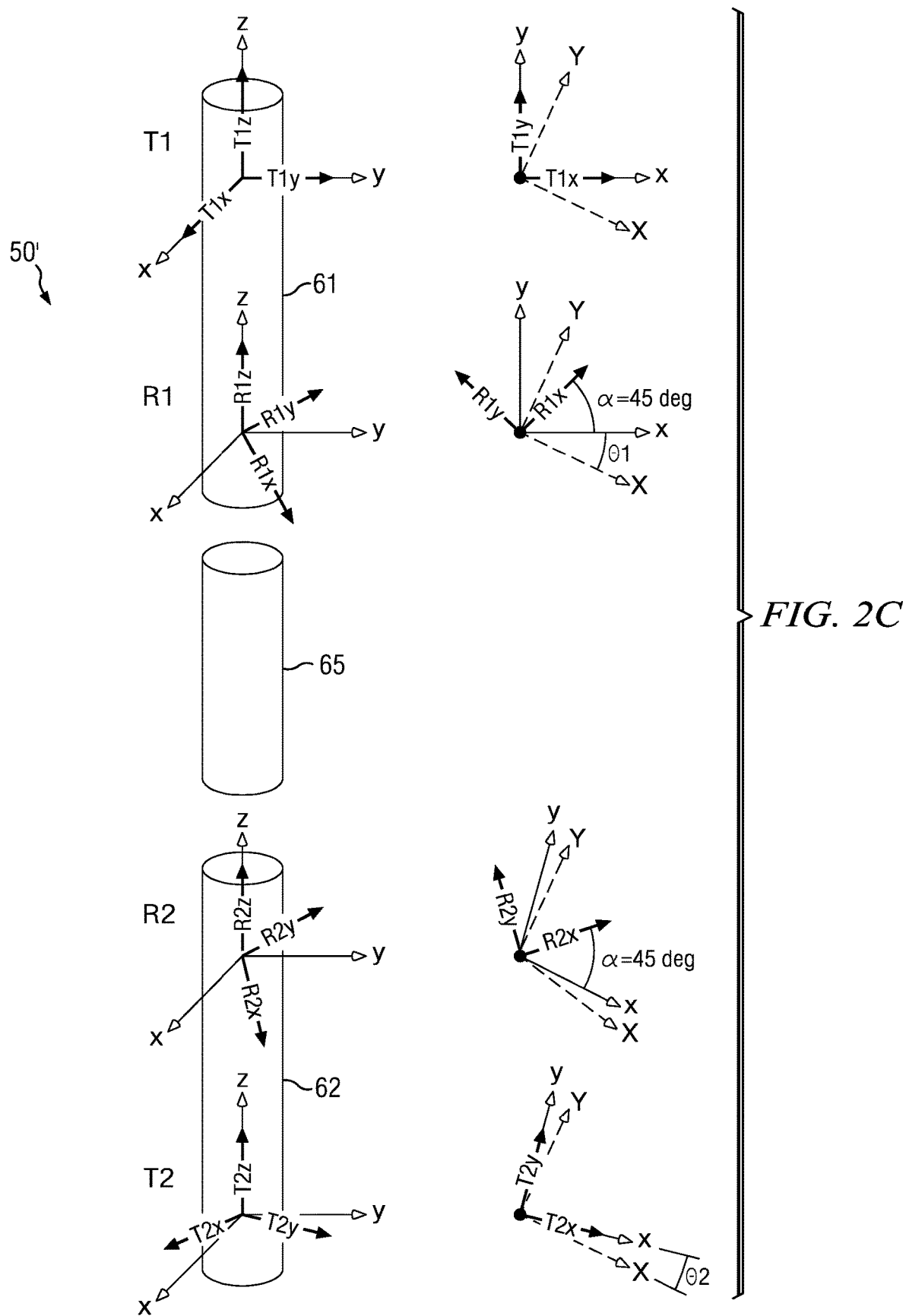
FIG. 2C schematically depicts the antenna moments in an alternative electromagnetic logging tool including triaxial transmitters and receivers.

FIG. 2C depicts an alternative electromagnetic measurement tool embodiment 50' in which the first and second transmitters are deployed on corresponding first and second subs 61 and 62 that are free to rotate with respect to one another (e.g., in an embodiment in which a drilling motor 65 is deployed therebetween). As in tool embodiment 50, each of the transmitters T1 and T2 and receivers R1 and R1 may include a tri-axial antenna arrangement. In the example embodiment depicted the moment of $R1_z$ is aligned with the moment of $T1_z$ (and the z-axis) while the moments of $R1_x$ and $R1_y$ are rotationally offset from the moments of $T1_x$ and $T1_y$ by an offset angle α (e.g., 45 degrees in the depicted embodiment). The moment of $R2_z$ is aligned with the moment of $T2_z$ while the moments of $R2_x$ and $R2_y$ are rotationally offset from the moments of $T2_x$ and $T2_y$ by α (e.g., 45 degrees). The disclosed embodiments are, of course, not limited in these regards.

As stated above, the first and second subs 61 and 62 may rotate with respect to one another such that the moments of the x- and y-axis transmitting and receiving antennas are misaligned and rotate with respect to one another (i.e., the misalignment angle between the subs varies with time). Using the notation shown on FIG. 2C, at any instant in time, the orientation angle of the x-axis on sub 61 (the $T1_x$ direction) is $\theta_1$ with respect to an arbitrary 'global' (or wellbore) x-direction. Likewise, at the same instant in time, the orientation angle of the x-axis on sub 62 (the $T2_x$ direction) is $\theta_2$ with respect to the global x-direction. It will thus be understood that the moments of the x- and y-transmitting and receiving antennas T1 and T2 and R1 and R2 are misaligned by a misalignment angle $\gamma = \theta_1\ \theta_2$. It will be understood that $\theta_1$ and $\theta_2$ may be referred to as toolface angles of the first and second subs in that they define the rotational orientation of the subs with respect to a global reference direction. Since $\theta_1$ and $\theta_2$ are variable with time (owing to the rotation of the subs) and since the subs rotate at different rates the misalignment angle γ also varies with time.

Figure 3:
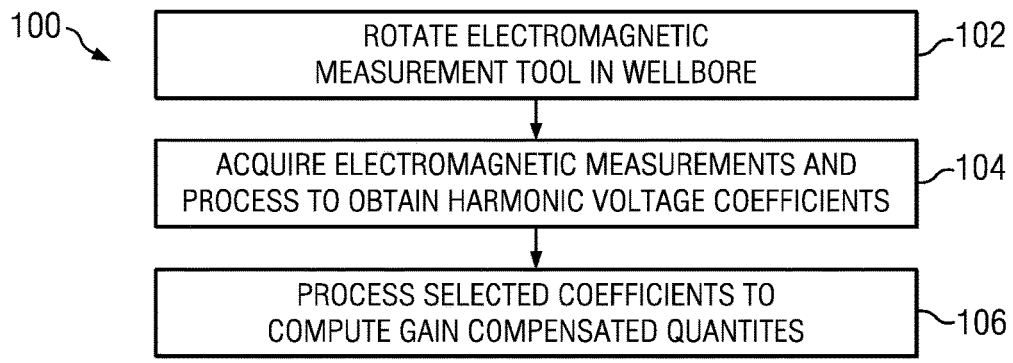
FIG. 3 depicts a flow chart of one disclosed method embodiment for computing gain compensated, azimuthally invariant measurement quantities.

FIG. 3 depicts a flow chart of one disclosed method embodiment 100 for computing gain compensated azimuthally invariant measurement quantities. An electromagnetic measurement tool (e.g., one of the measurement tools depicted on FIGS. 2B and 2C) is deployed in and rotated in a subterranean wellbore at 102 (e.g., while drilling the wellbore). Electromagnetic measurements are acquired at 104 (e.g., via firing the transmitters and receiving the corresponding electromagnetic waves at the receiving antennas) while the tool is rotating and processed to obtain harmonic voltage coefficients. Ratios of selected harmonic voltage coefficients may then be processed to obtain the gain compensated, azimuthally invariant measurement quantities at 106. The harmonic voltage coefficients are selected such that (i) the transmitter and receiver gains are canceled in the computed ratio (i.e., such that the coefficients in the numerator have the same gains as the coefficients in the denominator) and such that (ii) the measurement quantity is azimuthally invariant (i.e., such that the azimuthal response of the quantities in the denominator is the same, and thus cancels, the azimuthal response of the quantities in the numerator). For example, if the numerator includes a first harmonic cosine function then the denominator may be selected such that it also includes a first harmonic cosine function.

With continued reference to FIG. 3, and as is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennae may be processed, as is known to those of ordinary skill in the art, to obtain one or more properties of the formation.

In general, earth formations are anisotropic such that their electrical properties may be expressed as a 3×3 tensor that contains information on formation resistivity anisotropy, dip, bed boundaries and other aspects of formation geometry. It will be understood by those of ordinary skill in the art that the mutual couplings between the tri-axial transmitter antennas and the tri-axial receiver antennas depicted on FIGS. 2B and/or 2C form a 3×3 matrix and thus may have sensitivity to a full 3×3 formation impedance tensor. For example, a 3×3 matrix of measured voltages $V_{ij}$ may be expressed as follows:

$$V_{ij} = \begin{bmatrix} V_{ijxx} & V_{ijxy} & V_{ijxz} \\ V_{ijyx} & V_{ijyy} & V_{ijyz} \\ V_{ijzx} & V_{ijzy} & V_{ijzz} \end{bmatrix} = I_i Z_{ij} = \begin{bmatrix} I_{ix} & 0 & 0 \\ 0 & I_{iy} & 0 \\ 0 & 0 & I_{iz} \end{bmatrix} \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (1)$$

where $V_{ij}$ represent the 3×3 matrix of measured voltages with i indicating the corresponding transmitter triad (e.g., T1 or T2) and j indicating the corresponding receiver triad (e.g., R1 or R2), $I_i$ represent the transmitter currents, and $Z_{ij}$ represent the transfer impedances which depend on the electrical and magnetic properties of the environment surrounding the antenna pair in addition to the frequency, geometry, and spacing of the antennas. The third and fourth subscripts indicate the axial orientation of the transmitter and receiver antennas. For example, $V_{12xy}$ represents a voltage measurement on the y-axis antenna of receiver R2 from a firing of the x-axis antenna of transmitter T1.

When bending of the measurement tool is negligible (e.g., less than about 10 degrees), the measured voltages may be modeled mathematically, for example, as follows:

$$V_{ij} = G_{Ti} m_{Ti}^t (R_{\theta t}^t Z_{ij} R_{\theta r}) m_{Rj} G_{Rj} \quad (2)$$

where $Z_{ij}$ are matrices representing the triaxial tensor couplings (impedances) between the locations of transmitter i and receiver j, $G_{Ti}$ and $G_{Rj}$ are diagonal matrices representing the transmitter and receiver gains, $R_{\theta t}$ and $R_{\theta r}$ represent the rotation matrices for rotating the transmitter and receiver about the z-axis through angles $\theta_t$ and $\theta_r$, $m_{Ti}$ and $m_{Rj}$ represent the matrices of the direction cosines for the transmitter and receiver moments at $\theta=0$, and the superscript t represents the transpose of the corresponding matrix. The matrices in Equation 2 may be given, for example, as follows:

$$Z_{ij} = \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (3)$$

$$G_{Ti} = \begin{bmatrix} g_{Tix} & 0 & 0 \\ 0 & g_{Tiy} & 0 \\ 0 & 0 & g_{Tiz} \end{bmatrix} \quad (4)$$

$$G_{Rj} = \begin{bmatrix} g_{Rix} & 0 & 0 \\ 0 & g_{Riy} & 0 \\ 0 & 0 & g_{Riz} \end{bmatrix} \quad (5)$$

$$R_{\theta t} = \begin{bmatrix} \cos(\theta_t) & \sin(\theta_t) & 0 \\ \sin(\theta_t) & \cos(\theta_t) & 0 \\ 0 & 0 & 1 \end{bmatrix} \quad (6)$$

$$R_{\theta r} = \begin{bmatrix} \cos(\theta_r) & \sin(\theta_r) & 0 \\ \sin(\theta_r) & \cos(\theta_r) & 0 \\ 0 & 0 & 1 \end{bmatrix} \quad (7)$$

Using the T1x antenna direction as a reference direction for the first sub and the T2x antenna direction as a reference direction for the second sub, the matrices of the direction cosines of the transmitter and receiver moments may be given, for example, as follows:

$m_{T1} = I$ $m_{R1} = R_\alpha$ $m_{R2} = R_\alpha$ $m_{T2} = I$ where I represents the identity matrix and $R_\alpha$ represents the rotation matrix about the z-axis through the angle $\alpha$. It will be understood that Equations 2-8 are written for a general embodiment (such as shown on FIG. 2C) in which the subs 61 and 62 are free to rotate with respect to one another.

In an embodiment in which the transmitters and receivers are deployed on a common tool body (such that there is no misalignment as in FIG. 2B) it will be understood that $\theta_t = \theta_r$ such that $V_{ij} = G_{Ti} (R_\theta^t Z_{ij} R_\theta) G_{Rj}$. It will be understood that the disclosed embodiments are not limited in regard to the relative rotation of the transmitters and receivers. Gain compensated quantities may be computed with or without relative rotation between the transmitters and receivers. For example, commonly assigned U.S. patent application Ser. No. 14/549,396 (which is fully incorporated by reference herein) discloses methods for obtaining gain compensated measurements with differential rotation of the first transmitter and receiver with respect to the second transmitter and receiver (e.g., in an embodiment similar to that depicted on FIG. 2C). Commonly assigned U.S. patent application Ser. No. 14/325,797 (which is also fully incorporated by reference herein) discloses methods for obtaining compensated measurements in which the transmitters and receivers are rotationally fixed relative to one another (e.g., in an embodiment similar to that depicted on FIG. 2B).

In embodiments in which the transmitters and receivers are rotationally fixed, the rotated couplings may be expressed mathematically in harmonic form, for example, as follows:

$$R_\theta{}^t Z_{ij} R_\theta = Z_{DC\_ij} + Z_{FHC\_ij} \cos(\theta) + Z_{FHS\_ij} \sin(\theta) + Z_{SHC\_ij} \cos(2\theta) + Z_{SHS\_ij} \sin(2\theta) \quad (9)$$

where $Z_{DC\_ij}$ represents a DC (average) coupling coefficient, $Z_{FHC\_ij}$ and $Z_{FHS\_ij}$ represent first order harmonic cosine and first order harmonic sine coefficients, and $Z_{SHC\_ij}$ and $Z_{SHS\_ij}$ represent second order harmonic cosine and second order harmonic sine coefficients of the ij transmitter receiver couplings. These coefficients are shown below:

$$Z_{DC\_ij} = \begin{bmatrix} \frac{Z_{ijxx} + Z_{ijyy}}{2} & \frac{(Z_{ijxy} \; Z_{ijyx})}{2} & 0 \\ \frac{(Z_{ijxy} \; Z_{ijyx})}{2} & \frac{Z_{ijxx} + Z_{ijyy}}{2} & 0 \\ 0 & 0 & Z_{ijzz} \end{bmatrix} \quad (10)$$

$$Z_{FHC\_ij} = \begin{bmatrix} 0 & 0 & Z_{ijxz} \\ 0 & 0 & Z_{ijyz} \\ Z_{ijzx} & Z_{ijzy} & 0 \end{bmatrix}$$

$$Z_{FHS\_ij} = \begin{bmatrix} 0 & 0 & Z_{ijyz} \\ 0 & 0 & Z_{ijxz} \\ Z_{ijzy} & Z_{ijzx} & 0 \end{bmatrix}$$

$$Z_{SHC\_ij} = \begin{bmatrix} \frac{Z_{ijxx} \; Z_{ijyy}}{2} & \frac{(Z_{ijxy} + Z_{ijyx})}{2} & 0 \\ \frac{(Z_{ijxy} + Z_{ijyx})}{2} & \frac{(Z_{ijxx} \; Z_{ijyy})}{2} & 0 \\ 0 & 0 & 0 \end{bmatrix}$$

$$Z_{SHS\_ij} = \begin{bmatrix} \frac{(Z_{ijxy} + Z_{ijyx})}{2} & \frac{(Z_{ijxx} \; Z_{ijyy})}{2} & 0 \\ \frac{(Z_{ijxx} \; Z_{ijyy})}{2} & \frac{(Z_{ijxy} + Z_{ijyx})}{2} & 0 \\ 0 & 0 & 0 \end{bmatrix}$$

In general, the receiving antenna voltages are measured while the tool rotates in the borehole. Following the form of Equation 9, the measured voltages may be expressed mathematically in terms of their harmonic voltage coefficients, for example, as follows thereby enabling the harmonic voltage coefficients to be obtained:

$$V_{ij} = V_{DC\_ij} + V_{FHC\_ij} \cos(\theta) + V_{FHS\_ij} \sin(\theta) + V_{SHC\_ij} \cos(2\theta) + V_{SHS\_ij} \sin(2\theta) \quad (11)$$

wherein where $V_{DC\_ij}$ represents a DC voltage coefficient, $V_{FHC\_ij}$ and $V_{FHS\_ij}$ represent first order harmonic cosine and first order harmonic sine voltage coefficients (also referred to herein as first harmonic cosine and first harmonic sine voltage coefficients), and $V_{SHC\_ij}$ and $V_{SHS\_ij}$ represent second order harmonic cosine and second order harmonic sine voltage coefficients (also referred to herein as second harmonic cosine and second harmonic sine voltage coefficients) of the ij transmitter receiver couplings.

It will be understood that collocated tri-axial transmitter and receiver embodiments (e.g., as depicted on FIGS. 2B and 2C) are not required to gain compensate certain of the 3×3 matrix components. For example, the axial cross terms (i.e., the xz, zx, yz, and zy terms) may be gain compensated using any tool embodiment that includes an axial transmitter antenna, a transverse (cross-axial) transmitter antenna, an axial receiver antenna, and a transverse receiver antenna deployed on the tool body. These transmitter and receiver antennas may be distributed along the tool body with substantially any suitable spacing and order. Moreover, the transmitter antennas and/or the receiver antennas may be collocated (or not). The disclosed embodiments are not limited to any particular transmitter and receiver antenna configuration so long as the tool includes at least one axial transmitter antenna, at least one transverse transmitter antenna, at least one axial receiver antenna, and at least one transverse receiver antenna.

Taking ratios between the DC xx and yy voltage measurements or the second harmonic xx and yy voltage measurements given in Equation 10 allows a gain ratio $gT_i$ of the x to y transmitter and gain ratio $gR_j$ of the x to y receiver to be obtained, for example, as follows:

$$gR_j = \sqrt{\frac{V_{DC_{ijxx}}}{V_{DC_{ijyy}}} \frac{V_{DC_{ijyx}}}{V_{DC_{ijxy}}}} = \quad (12)$$

$$\sqrt{\frac{V_{SHC_{ijxx}}}{V_{SHC_{ijyy}}} \frac{V_{SHC_{ijyx}}}{V_{SHC_{ijxy}}}} = \sqrt{\frac{V_{SHS_{ijxx}}}{V_{SHS_{ijyy}}} \frac{V_{SHS_{ijyx}}}{V_{SHS_{ijxy}}}} = \frac{g_{Rjx}}{g_{Rjy}}$$

$$gT_i = \sqrt{\frac{V_{DC_{ijxx}}}{V_{DC_{ijyy}}} \frac{V_{DC_{ijxy}}}{V_{DC_{ijyx}}}} =$$

$$\sqrt{\frac{V_{SHC_{ijxx}}}{V_{SHC_{ijyy}}} \frac{V_{SHC_{ijxy}}}{V_{SHC_{ijyx}}}} = \sqrt{\frac{V_{SHS_{ijxx}}}{V_{SHS_{ijyy}}} \frac{V_{SHS_{ijxy}}}{V_{SHS_{ijyx}}}} = \frac{g_{Tix}}{g_{Tiy}}$$

Since the gain ratio formulas in Equation 12 involve taking a square root, there may be a 180 degree phase ambiguity (i.e., a sign ambiguity). As such, the gain ratios may not be arbitrary, but should be controlled such that they are less than 180 degrees. For un-tuned receiving antennas, the electronic and antenna gain/phase mismatch (assuming the antenna wires are not flipped from one receiver to another) may generally be controlled to within about 30 degrees (particularly at the lower frequencies used for deep measurements). This is well within 180 degrees (even at elevated temperatures where the mismatch may be at its greatest). For tuned transmitting antennas, however, the phase may change signs (i.e., jump by 180 degrees) if the drift in the antenna tuning moves across the tuning resonance. Such transmitter phase ratio ambiguity (sign ambiguity) may be resolved, for example, using Equation 12 and the knowledge that the receiver gain/phase ratio is not arbitrary, but limited to about 30 degrees (i.e. to enable the determination of whether the transmitter phase difference is closer to 0 or 180 degrees).

The x and y gain ratios defined in Equation 12 enable the following gain ratio matrices to be defined:

$$G_{Rj\_ratio} = \begin{bmatrix} 1 & 0 & 0 \\ 0 & gR_j & 0 \\ 0 & 0 & 1 \end{bmatrix} = \begin{bmatrix} 1 & 0 & 0 \\ 0 & \frac{g_{Rjx}}{g_{Rjy}} & 0 \\ 0 & 0 & 1 \end{bmatrix} \quad (13)$$

$$G_{Ti\_ratio} = \begin{bmatrix} 1 & 0 & 0 \\ 0 & gT_i & 0 \\ 0 & 0 & 1 \end{bmatrix} = \begin{bmatrix} 1 & 0 & 0 \\ 0 & \frac{g_{Tix}}{g_{Tiy}} & 0 \\ 0 & 0 & 1 \end{bmatrix}$$

where $G_{Rj\_ratio}$ represents the gain ratio matrix for receiver Rj and $G_{Ti\_ratio}$ represents the gain ratio matrix for transmitter Ti.

Applying these gain ratios to the measured voltages (shown in Equation 11) enables the y transmitter and y receiver gains to be replaced by x transmitter and x receiver gains. The voltage measurements may then be rotated mathematically to simulate rotation of the x and y antennas in the R1 and R2 receivers and the T2 transmitter such that they are rotationally aligned with the x and y antennas in the T1 transmitter. Such rotation removes the effect of the offset angle α and misalignment angle γ on the measurements and results in the following back-rotated Fourier coefficients:

$$VR_{DCij} = R^t_{\beta_{Ti}} G_{Ti\_ratio} V_{DCij} G_{Rj\_ratio} R_{\beta_{Rj}} = \qquad (14)$$

$$\begin{bmatrix} g_{Tix}g_{Rjx}\frac{\overline{Z}_{ijxx}+\overline{Z}_{ijyy}}{2} & g_{Tix}g_{Rjx}\frac{(\overline{Z}_{ijxy}-\overline{Z}_{ijyx})}{2} & 0 \\ g_{Tix}g_{Rjx}\frac{(\overline{Z}_{ijxy}-\overline{Z}_{ijyx})}{2} & g_{Tix}g_{Rjx}\frac{\overline{Z}_{ijxx}+\overline{Z}_{ijyy}}{2} & 0 \\ 0 & 0 & g_{Tiz}g_{Rjz}Z_{ijzz} \end{bmatrix}$$

$$VR_{FHCij} = R^t_{\beta_{Ti}} G_{Ti\_ratio} V_{FHCij} G_{Rj\_ratio} R_{\beta_{Rj}} = \qquad (15)$$

$$\begin{bmatrix} 0 & 0 & g_{Tix}g_{Rjx}Z_{ijxz} \\ 0 & 0 & g_{Tix}g_{Rjz}Z_{ijyz} \\ g_{Tiz}g_{Rjx}Z_{ijzx} & g_{Tiz}g_{Rjx}Z_{ijzy} & 0 \end{bmatrix}$$

$$VR_{FHSij} = R^t_{\beta_{Ti}} G_{ti\_ratio} V_{FHSij} G_{Rj\_ratio} R_{\beta_{Rj}} = \qquad (16)$$

$$\begin{bmatrix} 0 & 0 & g_{Tix}g_{Rjx}Z_{ijyz} \\ 0 & 0 & g_{Tix}g_{Rjz}Z_{ijxz} \\ g_{Tiz}g_{Rjx}Z_{ijzy} & g_{Tiz}g_{Rjx}Z_{ijzx} & 0 \end{bmatrix}$$

$$VR_{SHCij} = R^t_{\beta_{Ti}} G_{Ti\_ratio} V_{SHCij} G_{Rj\_ratio} R_{\beta_{Rj}} = \qquad (17)$$

$$\begin{bmatrix} g_{Tix}g_{Rjx}\frac{Z_{ijxx}-Z_{ijyy}}{2} & g_{Tix}g_{Rjx}\frac{(Z_{ijxy}+z_{ijyx})}{2} & 0 \\ g_{Tix}g_{Rjx}\frac{(Z_{ijxy}+Z_{ijyx})}{2} & g_{Tix}g_{Rjx}\frac{Z_{ijxx}-Z_{ijyy}}{2} & 0 \\ 0 & 0 & 0 \end{bmatrix}$$

$$VR_{SHSij} = R^t_{\beta_{Ti}} G_{Ti\_ratio} V_{SHSij} G_{Rj\_ratio} R_{\beta_{Rj}} = \qquad (18)$$

$$\begin{bmatrix} g_{Tix}g_{Rjx}\frac{Z_{ijxy}+Z_{ijyx}}{2} & g_{Tix}g_{Rjx}\frac{(Z_{ijxx}-z_{ijyy})}{2} & 0 \\ g_{Tix}g_{Rjx}\frac{(Z_{ijxx}-Z_{ijyy})}{2} & g_{Tix}g_{Rjx}\frac{Z_{ijxy}+Z_{ijyx}}{2} & 0 \\ 0 & 0 & 0 \end{bmatrix}$$

where VR represent the rotated coefficients, $\beta_{T1}=0$, $\beta_{R1}=\alpha$, $\beta_{T2}=\gamma$, and $\beta_{R2}=(\alpha+\gamma)$.

The following terms may be obtained from the back rotated coefficients given in Equations 14-18:

$$xxpyy_{ij}=VR_{DCijxx}+VR_{DCijyy}=g_{Tix}g_{Rjx}(\overline{Z}_{ijxx}+\overline{Z}_{ijyy}) \qquad (19)$$

$$xxmyy_{ij}=0.5\times(VR_{SHCijxx} VR_{SHCijyy} VR_{SHSijyx} VR_{SHSijxy})=g_{Tix}g_{Rjx}(\overline{Z}_{ijxx} \overline{Z}_{ijyy}) \qquad (20)$$

$$xymyx_{ij}=VR_{DCijxy}, VR_{DCijyx}=g_{Tix}g_{Rjx}(\overline{Z}_{ijxy} \overline{Z}_{ijyx}) \qquad (21)$$

$$xypyx_{ij}=0.5\times(VR_{SHCijxy}+VR_{SHCijyx}+VR_{SHSijxx} VR_{SHSijyy})=g_{Tix}g_{Rjx}(\overline{Z}_{ijxy}+\overline{Z}_{ijyx}) \qquad (22)$$

where the overhead bar in $\overline{Z}_{ijxx}$, $\overline{Z}_{ijyy}$, $\overline{Z}_{ijxy}$, and $\overline{Z}_{ijyx}$ indicates that the value is obtained from the Fourier coefficients which is an average. The common gain factor in these terms is $g_{Tix}g_{Rjx}$.

The following additional terms representative of the nine tensor components in 3×3 matrix may be obtained, for example, as follows:

$$VR\overline{Z}_{ijxx}=0.5\times(xxpyy_{ij}+xxmyy_{ij})=g_{Tix}g_{Rjx}\overline{Z}_{ijxx} \qquad (23)$$

$$VR\overline{Z}_{ijyy}=0.5\times(xxpyy_{ij} xxmyy_{ij})=g_{Tix}g_{Rjx}\overline{Z}_{ijyy} \qquad (24)$$

$$VR\overline{Z}_{ijxy}=0.5\times(xypyx_{ij}+xymyx_{ij})=g_{Tix}g_{Rjx}\overline{Z}_{ijxy} \qquad (25)$$

$$VR\overline{Z}_{ijyx}=0.5\times(xypyx_{ij} xymyx_{ij})=g_{Tix}g_{Rjx}\overline{Z}_{ijyx} \qquad (26)$$

$$VR\overline{Z}_{ijxz}=0.5\times(VR_{FHCijxz} VR_{FHSijyz})=g_{Tix}g_{Rjz}\overline{Z}_{ijxz} \qquad (27)$$

$$VR\overline{Z}_{ijzx}=0.5\times(VR_{FHCijzx} VR_{FHSijzy})=g_{Tiz}g_{Rjx}\overline{Z}_{ijzx} \qquad (28)$$

$$VR\overline{Z}_{ijyz}=0.5\times(VR_{FHCijyz}+VR_{FHSijxz})=g_{Tix}g_{Rjz}\overline{Z}_{ijyz} \qquad (29)$$

$$VR\overline{Z}_{ijzy}=0.5\times(VR_{FHCijzy}+VR_{FHSijzx})=g_{Tiz}g_{Rjx}\overline{Z}_{ijzy} \qquad (30)$$

$$VR\overline{Z}_{ijzz}=VR_{DCijzz}=g_{Tiz}g_{Rjz}\overline{Z}_{ijzz} \qquad (31)$$

These may be written in 3×3 matrix form, for example, as follows:

$$VR\overline{Z}_{ij} = \begin{bmatrix} VR\overline{Z}_{ijxx} & VR\overline{Z}_{ijxy} & VR\overline{Z}_{ijxz} \\ VR\overline{Z}_{ijyx} & VR\overline{Z}_{ijyy} & VR\overline{Z}_{ijyz} \\ VR\overline{Z}_{ijzx} & VR\overline{Z}_{ijzy} & VR\overline{Z}_{ijzz} \end{bmatrix} \qquad (32)$$

The quantities in Equations 23-32 contain transmitter and receiver gains. In order to use these measured quantities to accurately invert for formation properties, accurate and stable transmitter and receiver calibrations are required. However, performing accurate and stable calibrations that are valid over all tool operating conditions is extremely difficult and problematic (not to mention expensive). Thus, with reference again to FIG. 3, ratios of selected measurements may be computed to cancel out all the transmitter and receiver gains. These ratios may be thought of as having two components; the numerator and the denominator. In the discussion that follows the numerators and denominators are selected such that (i) the transmitter and receiver gains are canceled in the computed ratio (i.e., such that the coefficients in the numerator have the same gains as the coefficients in the denominator) and such that (ii) the measurement quantity is azimuthally invariant (i.e., such that the azimuthal response of the quantities in the denominator is the same, and thus cancels, the azimuthal response of the quantities in the numerator).

Gain Compensation

The following term by term (TBT) compensation operators may be defined for any measurement $X_{ij}$ obtained between transmitter i and receiver j, for example, as follows:

$$TBT2(X_{ij}) = \frac{X_{12}}{X_{11}} \times \frac{X_{21}}{X_{22}}$$

$$TBT(X_{ij}) = \sqrt{\frac{X_{12}}{X_{11}} \times \frac{X_{21}}{X_{22}}}$$

These operators are fully gain compensated in that numerator gain terms are canceled by the denominator gain terms. It will be understood that the above operators contain the same information about the formation parameters and that either may be used either in subsequent inversion processes. It will further be understood that there are two possible solutions for the square root in TBT($X_{ij}$) and that extra care should be taken to make sure that the same branch of solution is chosen in comparing measured data and model data.

Gain compensated measurements may be obtained from a k-direction transmitter and an l-direction receiver from triaxial stations 1 and 2 (in which k and l take on x, y, and z directions), for example, as follows:

$$TBT2(VR\overline{Z}_{ijkl}) = CZ_{kl}^2 = \frac{VR\overline{Z}_{12kl}}{VR\overline{Z}_{11kl}} \cdot \frac{VR\overline{Z}_{21kl}}{VR\overline{Z}_{22kl}} = \frac{\overline{Z}_{12kl}}{\overline{Z}_{11kl}} \cdot \frac{\overline{Z}_{21kl}}{\overline{Z}_{22kl}}$$

$$TBT(VR\overline{Z}_{ijkl}) = CZ_{kl} = \sqrt{\frac{VR\overline{Z}_{12kl}}{VR\overline{Z}_{11kl}} \cdot \frac{VR\overline{Z}_{21kl}}{VR\overline{Z}_{22kl}}} = \sqrt{\frac{\overline{Z}_{12kl}}{\overline{Z}_{11kl}} \cdot \frac{\overline{Z}_{21kl}}{\overline{Z}_{22kl}}}$$

A full 3×3 matrix may then be expressed, for example, as follows:

$$TBT(VR\overline{Z}_{ijkl}) = \begin{bmatrix} CZ_{xx} & CZ_{xy} & CZ_{xz} \\ CZ_{yx} & CZ_{yy} & CZ_{yz} \\ CZ_{zx} & CZ_{zy} & CZ_{zz} \end{bmatrix} \quad (33)$$

It will be understood that TBT($VR\overline{Z}_{ijkl}$) represent fully gain compensated measurements in that the numerator gain terms are canceled by the denominator gain terms. Gain compensated, azimuthally invariant measurements may be obtained by adhering to both criteria defined above.

Centered Tool

For a centered electromagnetic logging tool, the off-diagonal terms of TBT($VR\overline{Z}_{ijkl}$), i.e., $CZ_{xy}$, $CZ_{yx}$, $CZ_{xz}$, $CZ_{zx}$, $CZ_{yz}$, and $CZ_{zy}$, are azimuthally invariant. For example, the numerator of $CZ_{xz}$ includes $\overline{Z}_{12xz}$ and $\overline{Z}_{21zx}$, each of which is a first harmonic function of θ. The denominator of $CZ_{xz}$ includes of $\overline{Z}_{11xz}$ and $\overline{Z}_{22zx}$ each of which is also a first harmonic function of θ. The first harmonic function of θ in the denominator therefore cancels the first harmonic function of θ in the numerator such that the resultant $CZ_{xz}$ is both gain compensated and azimuthally invariant. Similarly $CZ_{zx}$, $CZ_{yz}$, and $CZ_{zy}$ each include a first harmonic function of θ in both the numerator and denominator such that they are azimuthally invariant. The off-diagonal terms $CZ_{xy}$ and $CZ_{yx}$ each include a second harmonic function of θ in both the numerator and denominator such that they are azimuthally invariant.

Of the diagonal terms, $CZ_{zz}$ only includes DC components and is therefore also azimuthally invariant. The remaining diagonal terms, $CZ_{xx}$ and $CZ_{yy}$, each include a DC term and a second harmonic function of θ such that they are not azimuthally invariant. The following compensated, azimuthally invariant quantities may be computed (contain the same information as $CZ_{xx}$ and $CZ_{yy}$ but are azimuthally invariant):

$$CRXXPYY = \quad (34)$$

$$TBT(\text{real}(xxpyy_{ij})) = \sqrt{\frac{\text{real}(XXPYY_{12})}{\text{real}(XXPYY_{11})} \times \frac{\text{real}(XXPYY_{21})}{\text{real}(XXPYY_{22})}}$$

$$CIXXPYY = TBT(\text{imag}(xxpyy_{ij})) =$$

$$\sqrt{\frac{\text{imag}(XXPYY_{12})}{\text{imag}(XXPYY_{11})} \times \frac{\text{imag}(XXPYY_{21})}{\text{imag}(XXPYY_{22})}}$$

$$CRXXMYY = \quad (35)$$

$$TBT(\text{real}(xxmyy_{ij})) = \sqrt{\frac{\text{real}(XXMYY_{12})}{\text{real}(XXMYY_{11})} \times \frac{\text{real}(XXMYY_{21})}{\text{real}(XXMYY_{22})}}$$

$$CRXXMYY = TBT(\text{imag}(xxmyy_{ij})) =$$

$$\sqrt{\frac{\text{imag}(XXMYY_{12})}{\text{imag}(XXMYY_{11})} \times \frac{\text{imag}(XXMYY_{21})}{\text{imag}(XXMYY_{22})}}$$

where CRXXPYY and CIXXPYY represent real and imaginary quantities that are related to an xx plus yy coupling component and CRXXMYY and CIXXMYY represent real and imaginary quantities that are related to an xx minus yy coupling component.

Eccentered Tool

For an eccentered (off centered) electromagnetic logging tool, the off-diagonal terms of TBT($VR\overline{Z}_{ijkl}$), i.e., $CZ_{xy}$, $CZ_{yx}$, $CZ_{xz}$, $CZ_{zx}$, $CZ_{yz}$, and $CZ_{zy}$, are generally no longer azimuthally invariant since the numerators include additional harmonic terms related to the eccentering azimuth φ. Alternative measurements are defined in order to obtain gain compensated azimuthally invariant measurements for an eccentered logging tool.

Figure 4:
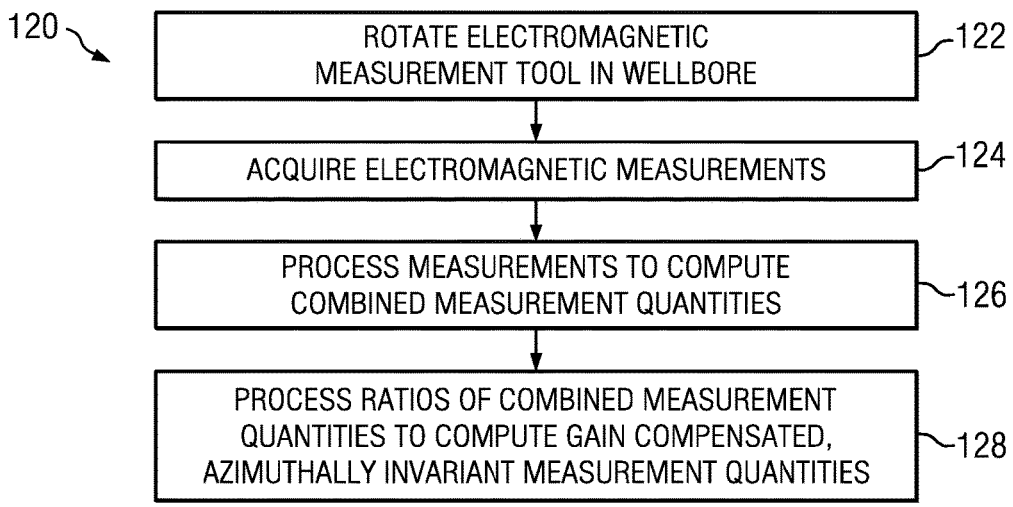
FIG. 4 depicts a flow chart of another disclosed method embodiment for computing gain compensated, azimuthally invariant measurement quantities.

FIG. 4 depicts a flow chart of an alternative methodology 120 for computing gain compensated azimuthally invariant measurement quantities. An electromagnetic measurement tool (e.g., one of the measurement tools depicted on FIGS. 2B and 2C) is deployed in and rotated in a subterranean wellbore at 122 (e.g., while drilling the wellbore). The measurement tool is generally (but not necessarily) eccentered (off-centered) in the wellbore while rotating in 122. A plurality of electromagnetic measurements is acquired at 124. These measurements may be acquired, for example, via sequentially firing a plurality of the transmitters and receiving the corresponding electromagnetic waves (voltages) at a corresponding plurality of the receiving antennas while the tool is rotating in 122. Certain ones of the electromagnetic measurements are combined (e.g., added or subtracted) to obtain combined measurement quantities at 126. In certain embodiments, the combined measurement quantities may be azimuthally invariant with respect to one or both of the formation dip azimuth and the eccentering azimuth. Ratios of selected ones of the combined measurement quantities may then be processed to compute the gain compensated, azimuthally invariant measurement quantities at 128.

Eccentered Tool—Axial Cross Coupling Components

Based on modeled data from an eccentered tool in a borehole, the $Z_{xz}$ and $Z_{zx}$ cross coupling impedances may be expressed in the following functional form:

$$XZ_{ij} = A_{xzij}FHF(\theta) + B_{xzij}FHF(\varphi) + C_{xzij}SHF(2\theta) + D_{xzij}SHF(2\varphi) \quad (36)$$

$$ZX_{ij} = A_{zxij}FHF(\theta) + B_{zxij}FHF(\varphi) + C_{zxij}SHF(2\theta) + D_{zxij}SHF(2\varphi) \quad (37)$$

where A, B, C, and D represent coefficient values, and FHF and SHF represent first and second harmonic functions (e.g., sin and cos functions). The coefficients for the cross coupling impedances $Z_{xz}$ and $Z_{zx}$ are related to one another as follows:

$$A_{xzij} = A_{zxij}; \quad B_{xzij} = B_{zxij}; \quad C_{xzij} = C_{zxij}; \quad D_{xzij} = D_{zxij}; \quad \text{and}$$
$$A_{xzij} \sim B_{xzij} \gg C_{xzij} \sim D_{xzij}$$

such that Equations 36 and 37 may be combined, for example, as follows:

$$XZ_{ij}+ZX_{ij}=2(A_{xzij}FHF(\theta)+D_{xzij}SHF(2\varphi)) \quad (38)$$

$$XZ_{ij} ZX_{ij}=2(B_{xzij}FHF(\varphi)+C_{xzij}SHF(2\theta)) \quad (39)$$

The magnitude of $A_{xzij}$ and $B_{xzij}$ are generally similar to one another, but significantly larger than those of $C_{xzij}$ and $D_{xzij}$. For separate (different) transmitter and receiver stations (i, j=1, 2), the ratio of the magnitude of the real and imaginary components of $A_{xzij}$ to the real and imaginary components of $D_{xzij}$ vary as do the similar ratios of $B_{xzij}$ to $C_{xzij}$. Model data suggests that imag($XZ_{ij}+XZ_{ij}$) has the highest ratio such that the following approximations hold:

$$\text{Imag}(XZ_{ij}+ZX_{ij})=2\cdot\text{imag}(A_{xzij}FHF(\theta)+D_{xzij}SHF(2\varphi)) \\ 2\cdot\text{imag}(A_{xzij}FHF(\theta)) \quad (40)$$

The following gain compensated quantity related to the xz and zx cross coupling components is therefore essentially azimuthally invariant (since $A_{xzij} \gg D_{xzij}$):

$$CIXZPZX=TBT(\text{imag}(XZ_{ij}+ZX_{ij})) \quad (41)$$

Likewise, the following gain compensated quantity related to a sum of the yz and zy cross coupling components is also essentially azimuthally invariant.

$$CIYZPZY=TBT(\text{imag}(YZ_{ij}+ZY_{ij})) \quad (42)$$

Eccentered Tool—Transverse Coupling Components

Modeled data from an eccentered tool in a borehole show that the $Z_{xx}$ and $Z_{yy}$ coupling impedances may be expressed in the following functional form:

$$XX_{ij}=A_{xxij}+B_{xxij}SHF(2\theta)+C_{xxij}SHF(2\varphi) \quad (43)$$

$$YY_{ij}=A_{yyij}+B_{yyij}SHF(2\theta)+C_{yyij}SHF(2\varphi) \quad (44)$$

such that the compensated quantities $CZ_{xx}$ and $CZ_{yy}$ are not azimuthally invariant. Equations 43 and 44 may be combined, for example, as follows:

$$XX_{ij}+YY_{ij}=(A_{xxij}+A_{yyij})+(B_{xxij}+B_{yyij})SHF(2\theta)+(C_{xxij}+C_{yyij})SHF(2\varphi) \quad (45)$$

$$XX_{ij} YY_{ij}=(A_{xxij} A_{yyij})+(B_{xxij} B_{yyij})SHF(2\theta)+(C_{xxij} C_{yyij})SHF(2\varphi) \quad (46)$$

where the magnitude of both the real and imaginary parts of $(A_{xxij}+A_{yyij})$ is about 3 orders of magnitude greater than $(B_{xxij}+B_{yyij})$ and $(C_{xxij}+C_{yyij})$ such that:

$$(A_{xxij}+A_{yyij}) \gg (B_{xxij}+B_{yyij}) \text{ and } (C_{xxij}+C_{yyij})$$

and $$XX_{ij}+YY_{ij} (A_{xxij}+A_{yyij}) \quad (47)$$

The following gain compensated, azimuthally invariant quantities related to a sum of the xx and yy coupling components may therefore be computed.

$$CRXXPYY=TBT(\text{real}(XX_{ij}+YY_{ij}))$$

$$CIXXPYY=TBT(\text{imag}(XX_{ij}+YY_{ij})) \quad (48)$$

The functional form of $XX_{ij} YY_{ij}$ suggests that TBT($XX_{ij} YY_{ij}$) is not azimuthally invariant when the tool is eccentered (since $(A_{xxij} A_{yyij}) \sim (B_{xxij} B_{yyij}) \sim (C_{xxij} C_{yyij})$).

Eccentered Tool—Transverse Cross Coupling Components

Modeled data from an eccentered tool in a borehole show that the $Z_{xy}$ and $Z_{yx}$ cross coupling impedances may be expressed in the following functional form:

$$XY_{ij}=A_{xyij}FHF(\theta)+B_{xyij}SHF(2\theta)+C_{xyij}FHF(\varphi)+D_{xyij}SHF(2\varphi) \quad (49)$$

$$YX_{ij}=A_{yxij}FHF(\theta)+B_{yxij}SHF(2\theta)+C_{yxij}FHF(\varphi)+D_{yxij}SHF(2\varphi) \quad (50)$$

where:

$$A_{xyij}=A_{yxij}=C_{xyij}=C_{yxij}; \, B_{xyij}=B_{yxij}; \text{ and } D_{xyij}=D_{yxij}$$

Equations 49 and 50 may therefore be combined, for example, as follows:

$$XY_{ij}+YX_{ij}=2B_{xyij}SHF(2\theta)+2D_{xyij}SHF(2\varphi) \quad (51)$$

$$XY_{ij} YX_{ij}=2A_{xyij}(FHF(\theta)+FHF(\varphi)) \quad (52)$$

The following gain compensated, azimuthally invariant quantities related to a difference between the xy and yx cross coupling components may therefore be computed.

$$CRXYMYX=TBT(\text{real}(XY_{ij} YX_{ij}))$$

$$CRXYMYX=TBT(\text{imag}(XY_{ij} YX_{ij})) \quad (53)$$

The functional form of $XY_{ij}+YX_{ij}$ suggests that TBT ($XY_{ij}+YX_{ij}$) is not azimuthally invariant.

Eccentered Tool—Axial Coupling Component

The $Z_{zz}$ coupling impedance may be expressed in the following functional form:

$$ZZ_{ij}=A_{zzij}+B_{zzij}(SHF(2)+SHF(2\varphi)) \quad (54)$$

where real($A_{zzij}$) $\gg$ real($B_{zzij}$). Since the magnitude of the real part of $A_{zzij}$ is about 3 order of magnitude greater than that of $B_{zzij}$, TBT(real($Z_{zz}$)) is essentially azimuthally invariant.

It will be understood that in isotropic formations or anisotropic formations having zero dip, the off-diagonal components of $VR\overline{Z}_{ij}$ (equation 32) are equal to zero. Moreover, in anisotropic formations having non-zero dip, the off-diagonal components of $VR\overline{Z}_{ij}$ generally exhibit zero-crossing points. The axial (z-related) non-diagonal terms have two zero-crossing points while the non-axial (non z-related) off-diagonal terms have 4 zero-crossing points as the formation dip azimuth varies. It will be readily apparent that when the measurement of $VR\overline{Z}_{ij}$ has zero response (a zero value), the quantities in equation 33 are undefined (owing to a division by zero). In practice it may thus be necessary to trap and/or flag such conditions. For example, a noise floor may be evaluated for any particular measurement. Measurement values less than some factor (e.g., five) of the noise floor may thus be flagged.

Figure 5:
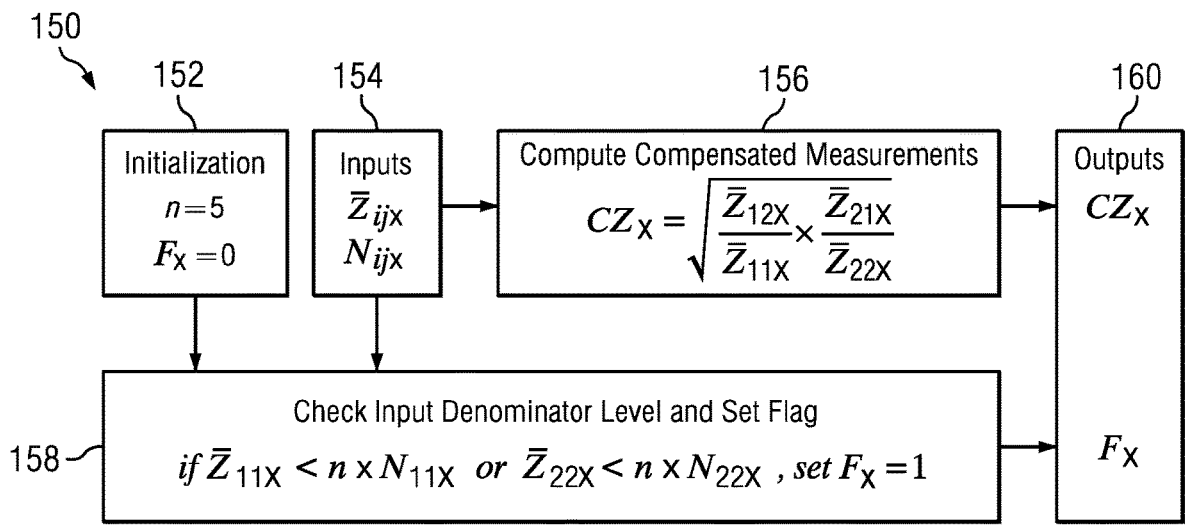
FIG. 5 depicts a flow chart of a method embodiment for obtaining a warning flag indicative of the validity of the computed quantity.

FIG. 5 depicts a flow chart of a method 150 for computing one of the gain compensated, azimuthally invariant quantities disclosed herein TBT($X_{ij}$) and a warning flag $F_x$ to indicate the validity of the computed quantity. The method is initialized at 152 by setting the warning flag to zero and selecting a value for multiplication factor n. Electromagnetic measurements X are received at 154, for example, including substantially any suitable measurements described above with respect to equations 32-54. For example, the measurements X may include the xz, zx, yz, zy, xy, yx, xx, yy, and/or zz tensor components and/or compound measurements such as xx+yy, xx−yy, xz+zx, xz−zx, yz+zy, yz−zy, xy+yx, and/or xy−yx, and/or real and imaginary components of any one or more of such measurements. Input $N_{ijx}$ represents the noise level of input measurement $\overline{Z}_{ijx}$.

With continued reference to FIG. 5, the compensated measurements may be computed at 156 (e.g., using one or more of the above described equations) and output at 160. A zero response in the denominator of the compensated quantity is evaluated at 158. A threshold value is obtained by multiplying factor n by the noise level ($n \cdot N_{ijx}$). Values above the threshold are considered to be non-zero while those below the threshold are taken to be equal to zero. The flag $F_x$ is set to the value 1 when one of the denominator terms is below the threshold. It will be understood that any suitable multiplication factor may be used (e.g., n=5). Higher values tend to disqualify more data points with the accepted data points having a higher confidence level. Lower values tend to accept more data points but have corresponding a lower a confidence level. The disclosed embodiments are in no way limited to any multiplication factor values.

Model Data Validation

The disclosed embodiments are now described in further detail by way of the following non-limiting computational examples. FIG. 6 depicts a schematic illustration of an eccentered electromagnetic logging tool 50 deployed in a wellbore 40 that penetrates an anisotropic formation at a relative dip angle is shown. A wellbore reference frame may be defined by x-, y-, and z-axes (which are fixed relative to the wellbore). A tool reference frame may be defined by x'-, y'-, and z'-axes which are fixed relative to the logging tool. Rotation of the tool in the wellbore causes the x'- and y'-tool axes rotate about the z- and z'-axes with respect to the x- and y-axes of the wellbore. The relative angle $\varphi$ between the reference frames (e.g., between the x- and x'-axes in the plane orthogonal to the z-axis) is commonly referred to in the art as the toolface angle.

The tool 50 is shown to be eccentered in the wellbore 40 (having a wellbore diameter d) by an eccentering distance decc at an eccentering azimuthal angle $\psi$ (in the wellbore reference frame). An apparent eccentering azimuth (also referred to as the apparent tool eccentering angle AZT) may be defined as the direction of tool eccentering in the tool reference frame (e.g., with respect to the x'-axis). The formation is depicted to be anisotropic, having vertical and horizontal conductivities σv and σh at a relative dip angle $\varphi_{dip}$ with respect to the x-axis (i.e., with respect to the wellbore reference frame). An apparent dip azimuth angle is indicated by $\Phi$ and represents the relative angle between an orientation marker on the tool (e.g., the x'-axis on the tool which is aligned with the magnetic dipole on the x-axis transmitter) and the direction of the formation's normal vector on the plane orthogonal to the tool's z'-axis. The apparent dip azimuth angle is also referred to herein as the apparent formation azimuth AZF. The conductivity of the drilling fluid is also indicated by σmud.

Figure 6A:
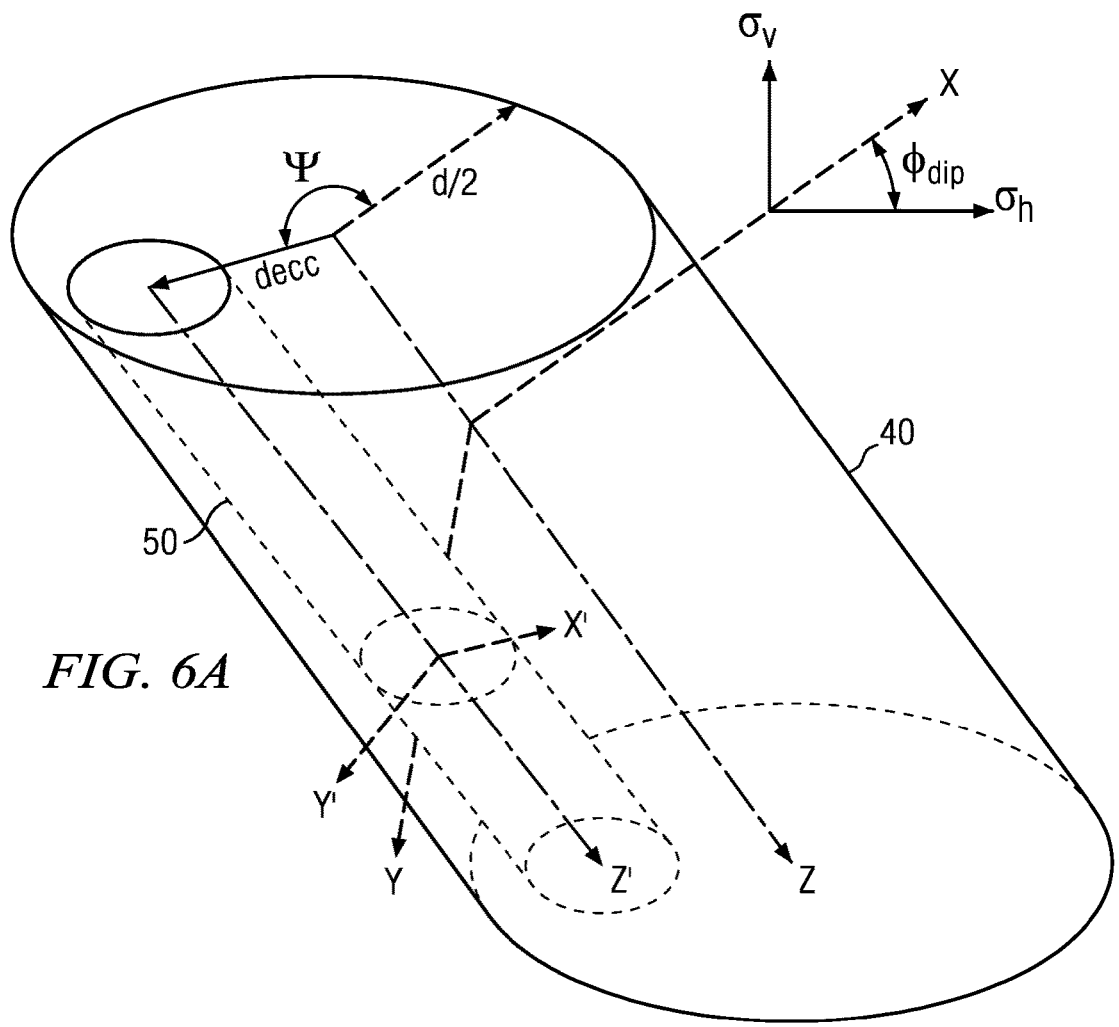
FIGS. 6A and 6B (collectively FIG. 6) depict a schematic illustration of an eccentered tool in a wellbore that penetrates an anisotropic formation at a relative dip angle.
Figure 6B:
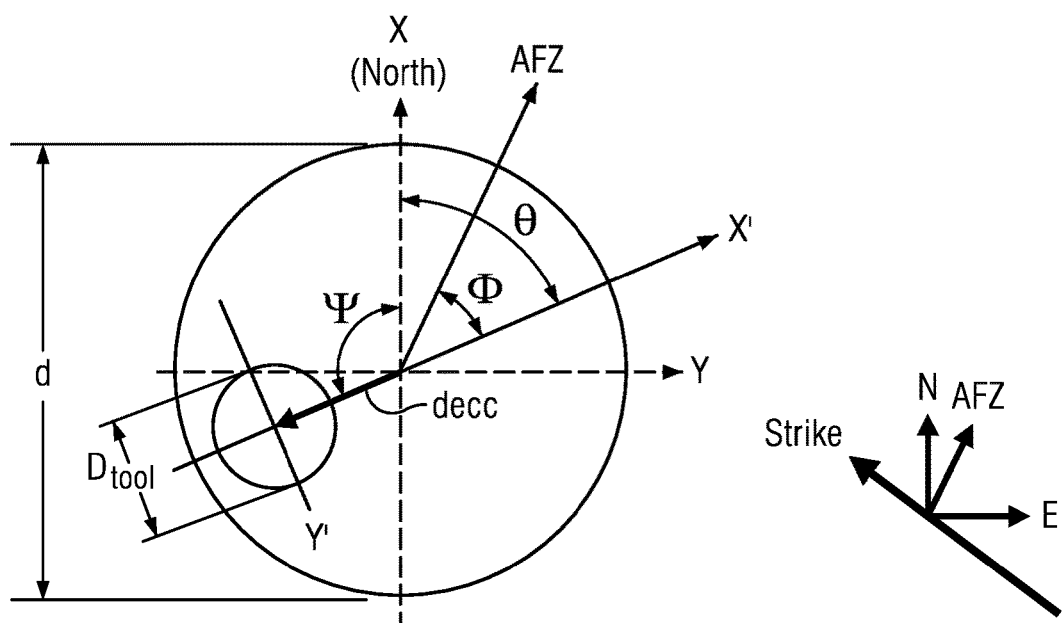

A finite element code was used to model the responses of the example triaxial tool depicted on FIG. 2B deployed in a wellbore traversing a dipping anisotropic formation such as that illustrated in FIGS. 6A and 6B. The transmitter-to-receiver spacing (between T1 and R1 and between T2 and R2) was 34 inches. The spacing between R1 and R2 was 18 inches. The outer diameter of the tool was 8.5 inches and the borehole diameter was 14 inches. The horizontal resistivity and the vertical resistivity of the anisotropic formation were Rh=1 ohm·m and Rv=5 ohm·m (it will be understood to those of ordinary skill in the art that conductivity and resistivity are reciprocally related and can be derived from one another). The wellbore was filled with an oil-based drilling fluid having a resistivity of 1000 ohm·m. The formation dip was 30 degrees and the apparent dip azimuth was incremented from 0 to 330 degrees in 30 degree steps for a total of 12 formation iterations.

For each formation iteration, the tool was deployed at an eccentering distance decc off center in the borehole with the apparent tool eccentering azimuth varying from 0 to 330 degrees in 30 degree increments for a total of 12 tool eccentering azimuth iterations. Thus for a given tool eccentering distance, a set of 144 iterations were generated (12 dip azimuth iterations times 12 eccentering azimuth iterations). Multiple sets of iterations were computed for corresponding tool eccentering distances ranging from 0 to 2 inches. The plots depicted on FIGS. 7-10B were computed for a centered tool. The plots on FIGS. 11A-15B were computed for an eccentered tool having an eccentering distance of 2 inches and various eccentering azimuth angles.

Figure 7:
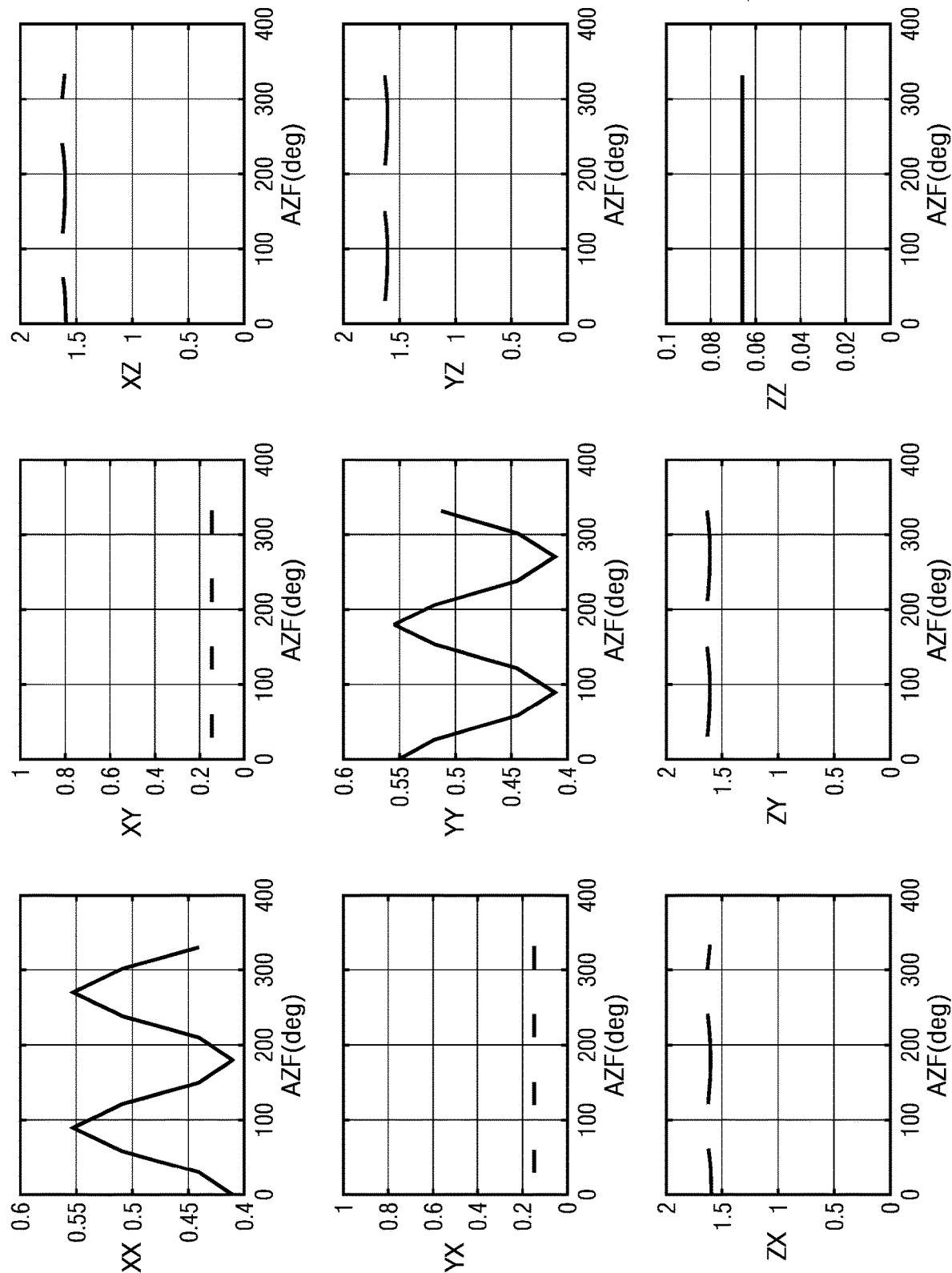
FIGS. 7 and 8 depict plots of compensated real (FIG. 7) and imaginary (FIG. 8) modeled measurements versus formation dip azimuth (AZF) for each of the 3×3 tensor components acquired from a centered tool.
Figure 8:
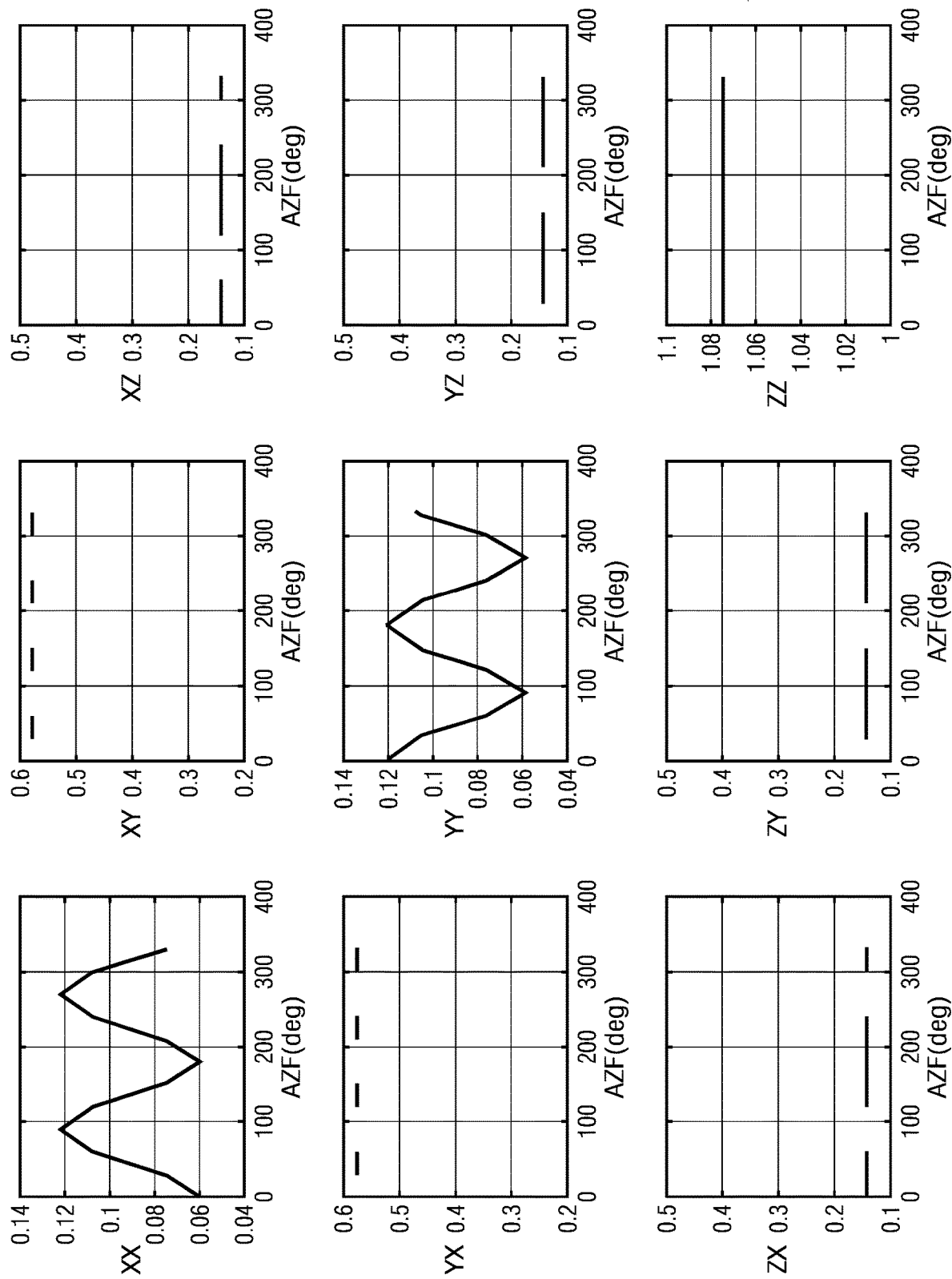

FIGS. 7 and 8 depict plots of modeled compensated real (FIG. 7) and imaginary (FIG. 8) measurements versus formation dip azimuth (AZF) for each of the 3×3 tensor components acquired from a centered tool. The gain compensated quantities were computed using the term by term (TBT) algorithm described above (e.g., in Equation 33). Note that the compensated response for each of the off-diagonal responses (i.e., the xy, yx, xz, zx, yz, and zy components) is essentially azimuthally invariant (essentially independent of the formation dip azimuth) for both the real and imaginary measurements. The gain compensated zz response (the axial coupling) is also observed to be azimuthally invariant. As described previously, the gain compensated xx and yy responses (the transverse couplings) vary with AZF as an approximate second harmonic function.

FIGS. 7 and 8 also demonstrate the utility of the zero-crossing flagging algorithm described above with respect to FIG. 4. The xy and yx components have four zero crossings (at AZF values of 0, 90, 180, and 270 degrees). These values have been flagged and removed from the plots. The xz, zx, yz, and zy components have two zero crossings (at AZF values of 90 and 270 degrees for the xz and zx components and values of 0 and 180 degrees for the yz and zy components). These values have also been flagged and removed from the corresponding plots.

Figure 9A:
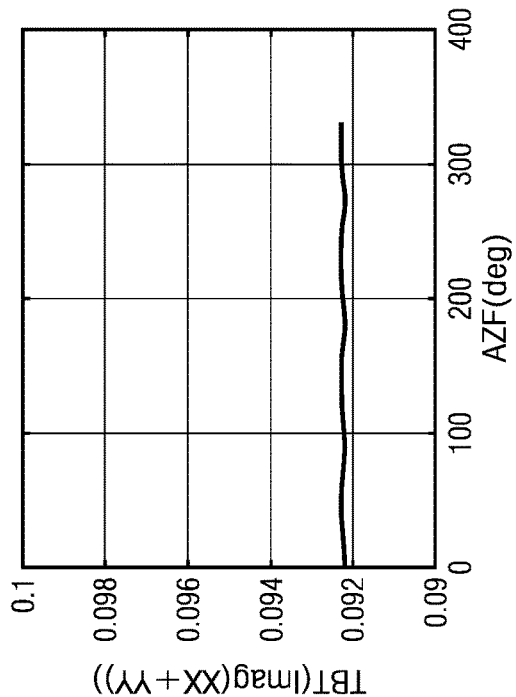
FIGS. 9A and 9B depict plots of TBT(real(xxpyy$_{ij}$)) and TBT(imag(xxpyy$_{ij}$)) versus AZF acquired from a centered tool.
Figure 9B:
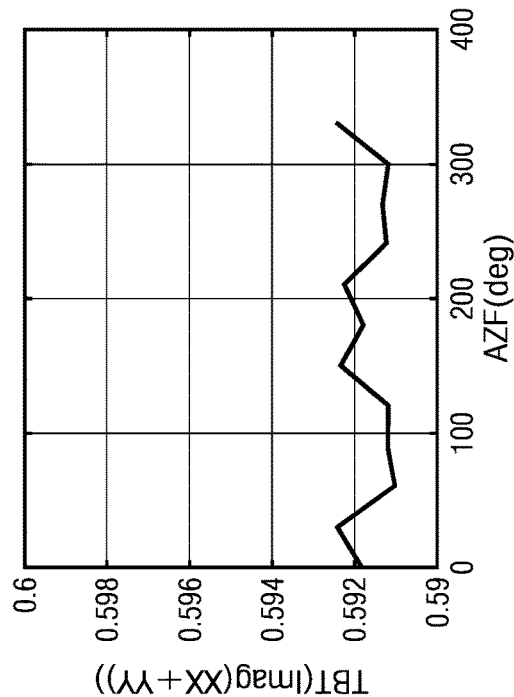

FIGS. 9A and 9B depict plots of TBT(real(xxpyy$_{ij}$)) and TBT(imag(xxpyy$_{ij}$)) versus AZF acquired from a centered tool and computed using Equation 34. Note that these gain compensated quantities are substantially azimuthally invariant (in this example varying less than 0.1% over 360 degrees of AZF).

Figure 10A:
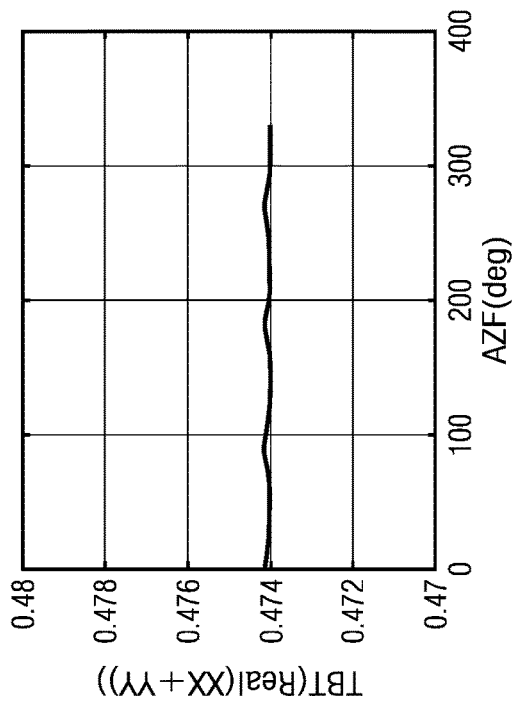
FIGS. 10A and 10B depict plots of TBT(real(xxmyy$_{ij}$)) and TBT(imag(xxmyy$_{ij}$)) versus AZF acquired from a centered tool.
Figure 10B:
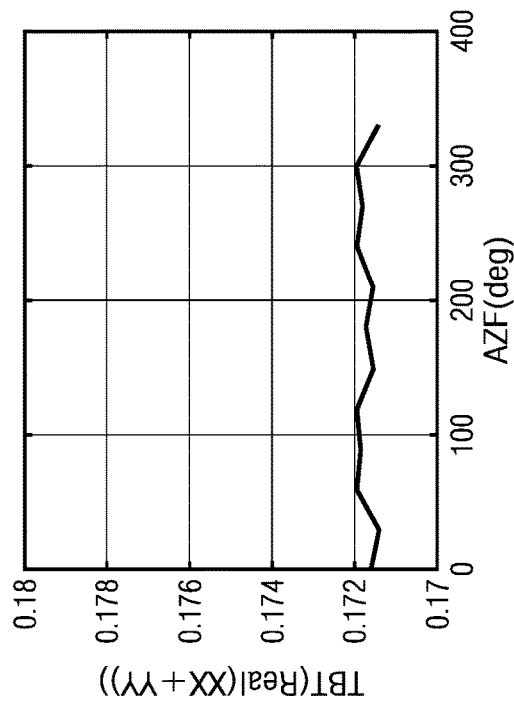

FIGS. 10A and 10B depict plots of TBT(real(xxmyy$_{ij}$)) and TBT(imag(xxmyy$_{ij}$)) versus AZF acquired from a centered tool and computed using Equation 35. Note that these gain compensated quantities are substantially azimuthally invariant (in this example varying less than 0.5% over 360 degrees of AZF).

Figure 11A:
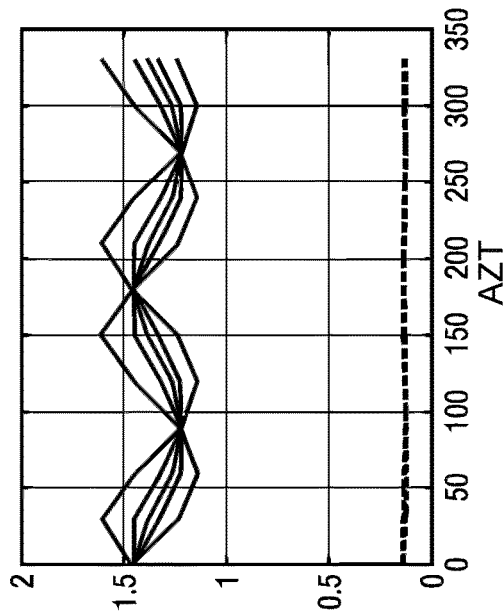
FIG. 11A depicts a plot of TBT(real(XZ$_{ij}$+ZX$_{ij}$)) and TBT(imag(XZ$_{ij}$+ZX$_{ij}$)) versus AZF at various tool eccentering azimuth values.

FIG. 11A depicts a plot of TBT(real(XZ$_{ij}$+ZX$_{ij}$)) and TBT(imag(XZ$_{ij}$+ZX$_{ij}$)) versus AZF at various tool eccentering azimuth values. As depicted, TBT(imag(XZ$_{ij}$+ZX$_{ij}$)) is azimuthally invariant with respect to both the formation dip azimuth (AZF) and the tool eccentering azimuth (AZT). TBT(real(XZ$_{ij}$+ZX$_{ij}$)) is shown to vary with AZF and AZT. Zero crossings at 90 and 270 degrees have been flagged and removed from the plot.

Figure 11B:
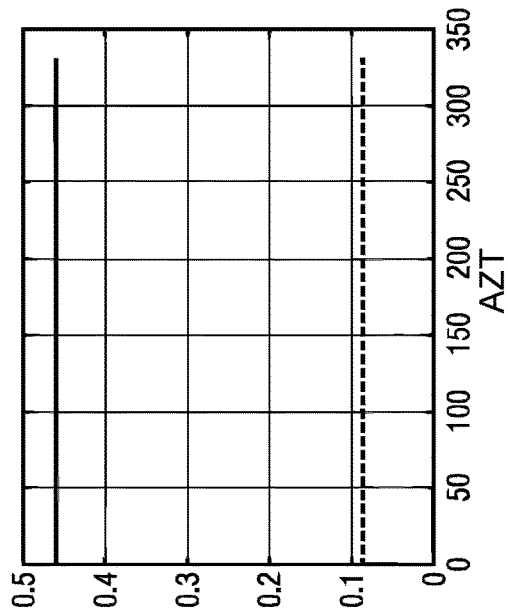
FIG. 11B depicts a plot of TBT(real(XZ$_{ij}$+ZX$_{ij}$)) and TBT(imag(XZ$_{ij}$+ZX$_{ij}$)) versus AZT at various formation dip azimuth values.

FIG. 11B depicts a plot of TBT(real(XZ$_{ij}$+ZX$_{ij}$)) and TBT(imag(XZ$_{ij}$+ZX$_{ij}$)) versus AZT at various formation dip azimuth values. As depicted, TBT(imag(XZ$_{ij}$+ZX$_{ij}$)) is azimuthally invariant with respect to both the formation dip azimuth (AZF) and the tool eccentering azimuth (AZT). TBT(real(XZ$_{ij}$+ZX$_{ij}$)) is shown to vary with AZF and AZT.

With continued reference to FIGS. 11A and 11B, it will be understood that TBT(real($YZ_{ij}+ZY_{ij}$)) and TBT(imag($YZ_{ij}+ZY_{ij}$)) are similar to TBT(real($XZ_{ij}+ZX_{ij}$)) and TBT(imag($XZ_{ij}+ZX_{ij}$)), but shifted by 90 degrees with respect to AZF and AZT. For example, the zero crossings are at 0 and 180 degrees when plotted with respect to AZF (analogously to FIG. 9A).

Figure 12A:
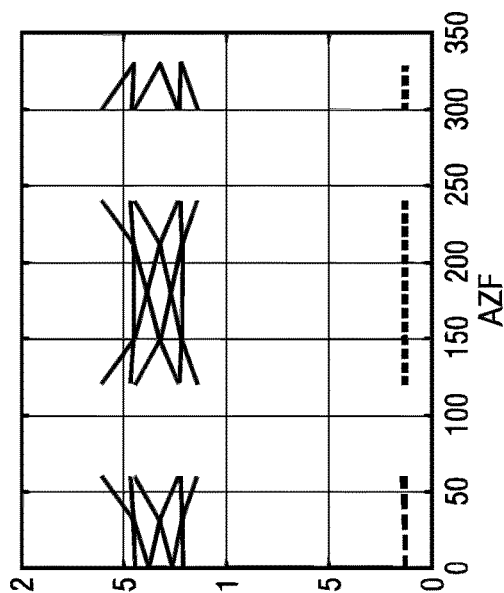
FIGS. 12A and 12B depict plots of TBT(real($XX_{ij}+YY_{ij}$)) and TBT(imag($XX_{ij}+YY_{ij}$)) versus AZF (FIG. 12A) and AZT (FIG. 12B).
Figure 12B:
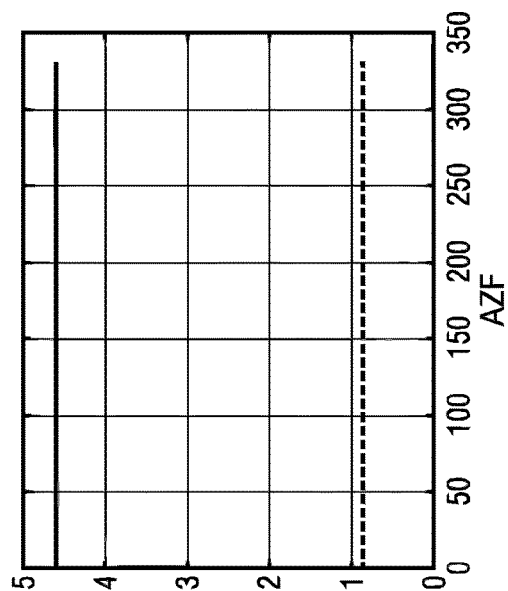

FIGS. 12A and 12B depict plots of TBT(real($XX_{ij}+YY_{ij}$)) and TBT(imag($XX_{ij}+YY_{ij}$)) versus AZF (FIG. 12A) and AZT (FIG. 12B) as computed using Equation 48. These measurement quantities are depicted to be invariant with respect to both the formation dip azimuth and the tool eccentering azimuth.

Figure 13A:
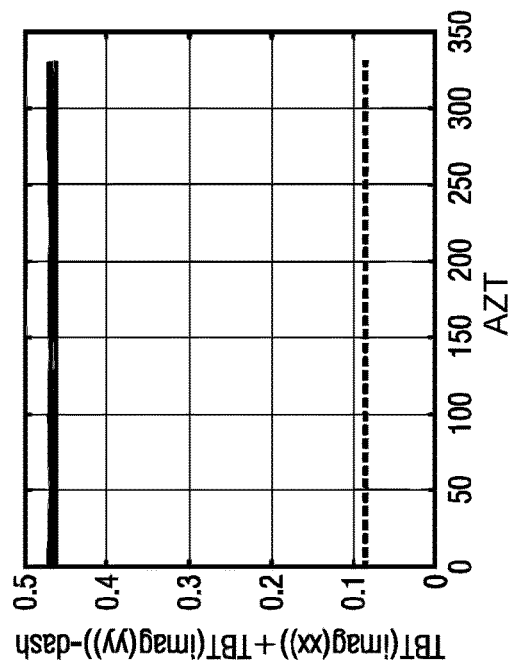
FIGS. 13A and 13B depict plots of TBT(real($XX_{ij}$))+TBT (real($YY_{ij}$)) and TBT(imag($XX_{ij}$))+TBT(imag($YY_{ij}$)) versus AZF (FIG. 13A) and AZT (FIG. 13B).
Figure 13B:
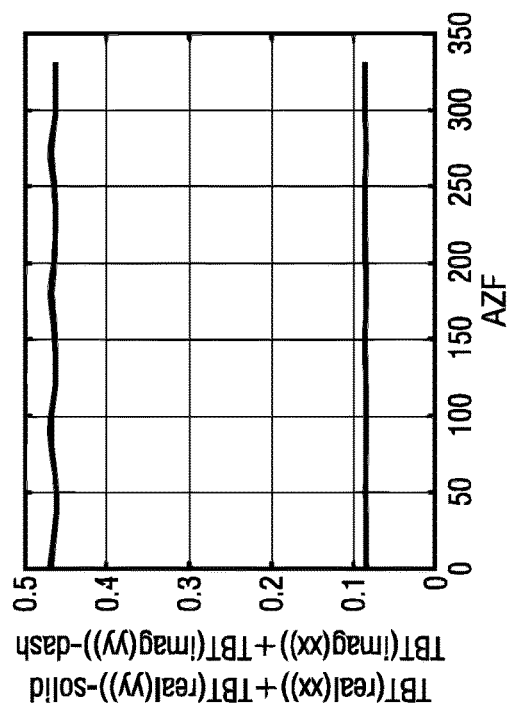

FIGS. 13A and 13B depict plots of TBT(real($XX_{ij}$))+TBT (real($YY_{ij}$)) and TBT(imag($XX_{ij}$))+TBT(imag ($YY_{ij}$)) versus AZF (FIG. 13A) and AZT (FIG. 13B). The imaginary measurement quantities are depicted to be invariant with respect to both the formation dip azimuth and the tool eccentering azimuth while the real measurement quantities show some variation with respect to both the formation dip azimuth and the tool eccentering azimuth.

Figure 14A:
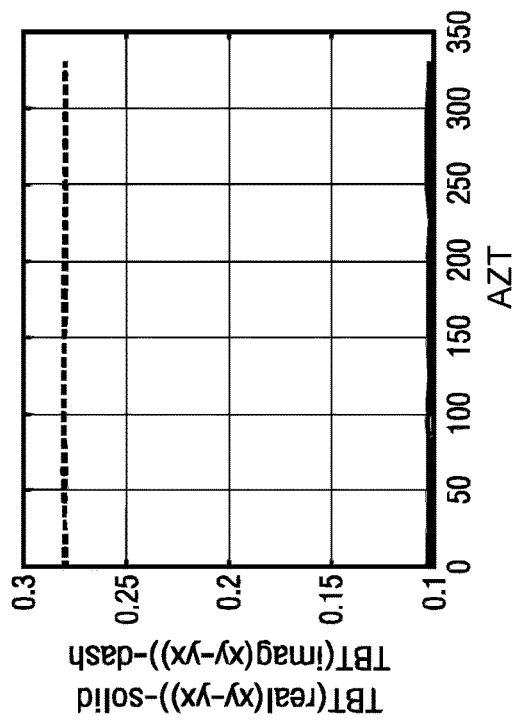
FIGS. 14A and 14B depict plots of TBT(real($XY_{ij}\ YX_{ij}$)) and TBT(imag($XY_{ij}\ YX_{ij}$)) versus AZF (FIG. 14A) and AZT (FIG. 14B).
Figure 14B:
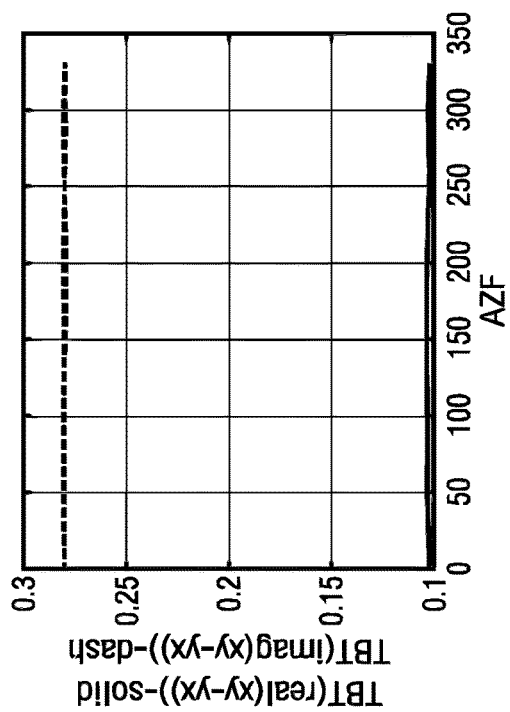

FIGS. 14A and 14B depict plots of TBT(real($XY_{ij}\ YX_{ij}$)) and TBT(imag($XY_{ij}\ YX_{ij}$)) versus AZF (FIG. 14A) and AZT (FIG. 14B) as computed using Equation 53. These measurement quantities are depicted to be invariant with respect to both the formation dip azimuth and the tool eccentering azimuth.

Figure 15A:
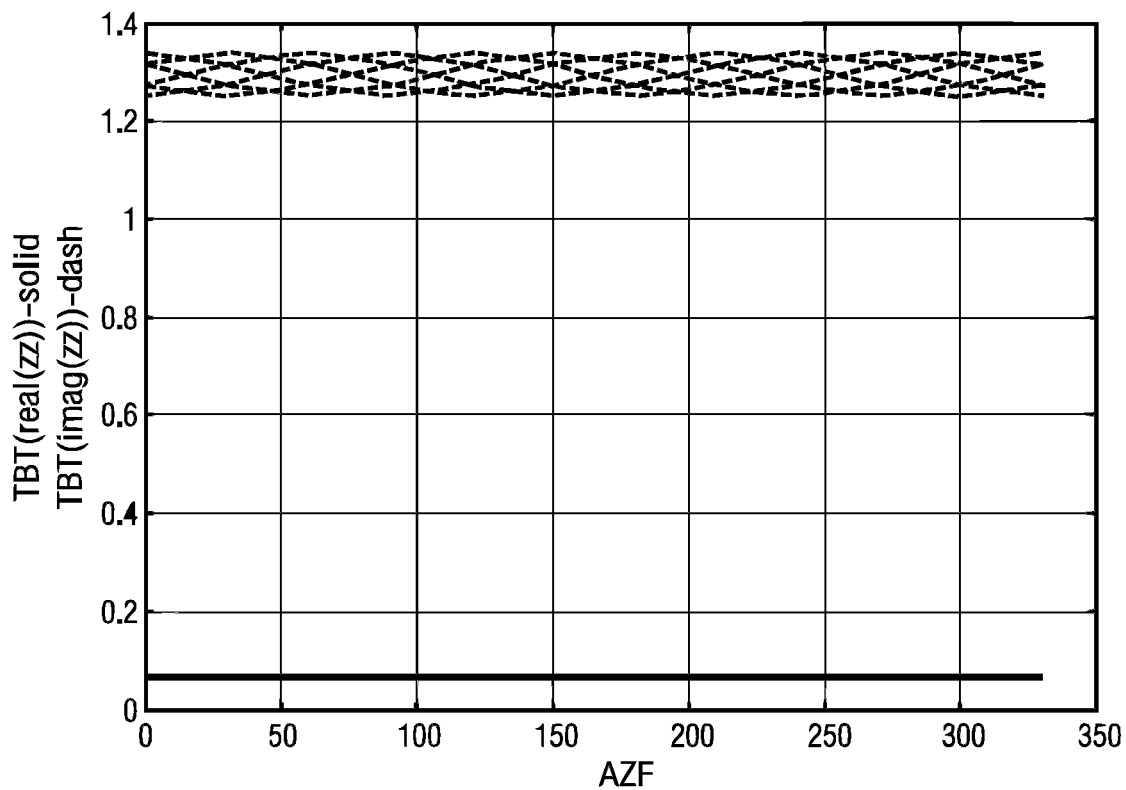
FIGS. 15A and 15B depict plots of TBT(real($Z_{zz}$)) and TBT(imagl($Z_{zz}$)) versus AZF (FIG. 15A) and AZT (FIG. 15B).
Figure 15B:
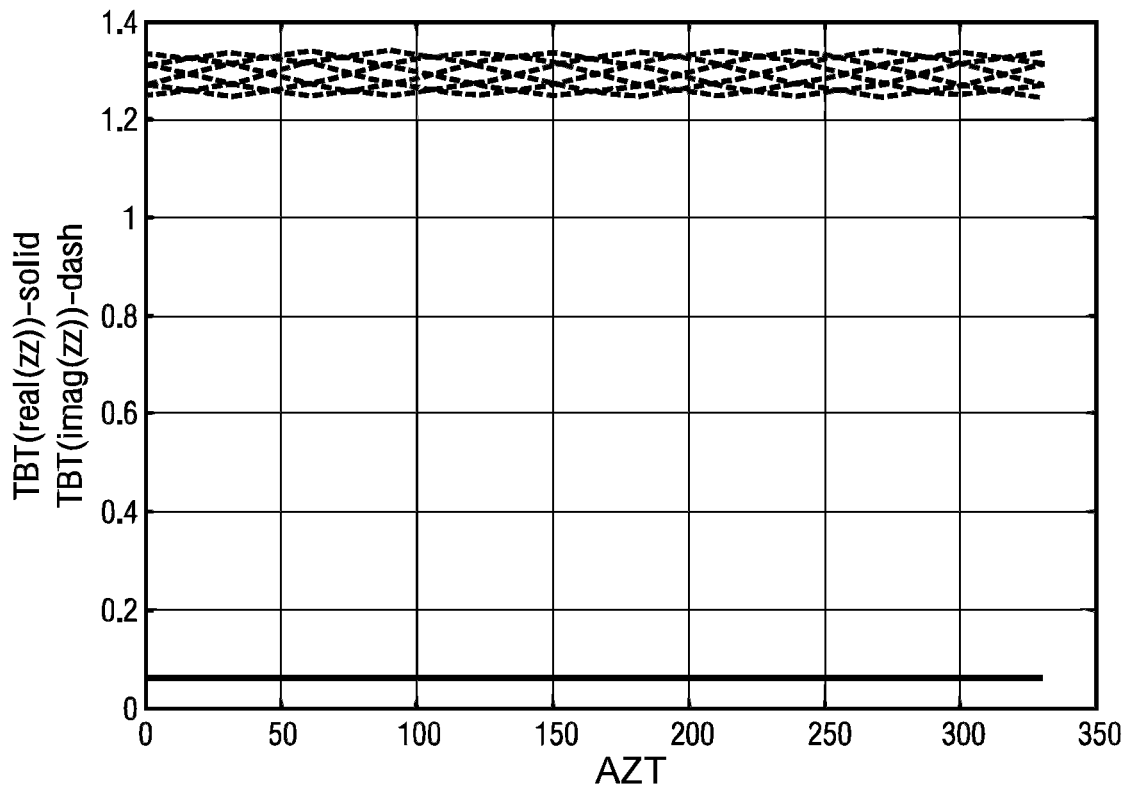

FIGS. 15A and 15B depict plots of TBT(real($Z_{zz}$)) and TBT(imagl($Z_{zz}$)) versus AZF (FIG. 15A) and AZT (FIG. 15B). TBT(real($Z_{zz}$)) is shown to vary with azimuth while TBT(imagl($Z_{zz}$)) is depicted to be invariant with respect to both the formation dip azimuth and the tool eccentering azimuth.

It will be understood that the various methods disclosed herein for computing gain compensated azimuthally invariant measurement quantities may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the computed quantities may be stored in downhole memory and/or transmitted to the surface while drilling via known telemetry techniques (e.g., mud pulse telemetry or wired drill pipe). Alternatively, the harmonic fitting coefficients or the compensated quantities may transmitted to the surface and the apparent formation azimuth, the apparent tool eccentering azimuth, and/or the tool eccentering distance may be computed at the surface using a surface processor. Whether transmitted to the surface or computed at the surface, the quantities may then be utilized in an inversion process (along with a formation model) to obtain various formation parameters as described above.

Although methods for making gain compensated, azimuthally invariant electromagnetic logging measurements have been described in detail, it should be understood that various changes, substitutions and alternations can be made herein without departing from the spirit and scope of the disclosure as defined by the appended claims.

What is claimed is:
1. A method comprising:
(a) operating an eccentered electromagnetic logging tool in a wellbore in a subterranean formation, the electromagnetic logging tool including a transmitter axially spaced apart from a receiver, the transmitter including an axial transmitting antenna and at least one transverse transmitting antenna, the receiver including an axial receiving antenna and at least one transverse receiving antenna;
(b) causing the axial transmitting antenna and the at least one transverse transmitting antenna to sequentially transmit corresponding electromagnetic waves into the wellbore;
(c) using the axial receiving antenna and the at least one transverse receiving antenna to receive voltage measurements corresponding to the electromagnetic waves transmitted in (b), wherein the voltage measurements comprise different coupling voltages;
(d) processing combinations of the different coupling voltages at least in part by matching of formation dip azimuth and tool eccentering azimuth harmonic functions to compute a gain compensated, azimuthally invariant measurement quantity; and
(e) performing an inversion using at least the gain compensated, azimuthally invariant measurement quantity to compute at least one conductivity value of the subterranean formation.

2. The method of claim 1, wherein the gain compensated, azimuthally invariant measurement quantity computed in (d) is azimuthally invariant with respect to at least one of the formation dip azimuth and the tool eccentering azimuth of the electromagnetic logging tool in the wellbore.

3. The method of claim 1, wherein the gain compensated, azimuthally invariant measurement quantity is related to an xz and a zx coupling or to a yz and a zy coupling.

4. The method of claim 1, wherein the gain compensated, azimuthally invariant measurement quantity is related to an imaginary component of an xz+zx coupling or an imaginary component of a yz+zy coupling.

5. The method of claim 1, wherein the gain compensated, azimuthally invariant measurement quantity is computed according to at least one of the following mathematical equations:

$$CIXZPZX=TBT(\text{imag}(XZ_{ij}+ZX_{ij}))$$

$$CIYZPZY=TBT(\text{imag}(YZ_{ij}+ZY_{ij}))$$

wherein CIXZPZX and CIYZPZY represent the gain compensated, azimuthally invariant measurement quantity, $XZ_{ij}$, $ZX_{ij}$, $YZ_{ij}$, and $ZY_{ij}$ represent the voltage measurements expressed as formation dip azimuth and tool eccentering azimuth harmonic functions, $XZ_{ij}+ZX_{ij}$ and $YZ_{ij}+ZY_{ij}$ comprise matched formation dip azimuth and tool eccentering azimuth harmonic functions, imag(·) represents an imaginary component of the matched formation dip azimuth and tool eccentering azimuth harmonic functions, and TBT(·) represents a computed ratio.

6. The method of claim 1, wherein the gain compensated, azimuthally invariant measurement quantity is related to an xx and a yy coupling.

7. The method of claim 1, wherein the gain compensated, azimuthally invariant measurement quantity is related to a real or an imaginary component of an xx+yy coupling.

8. The method of claim 1, wherein the gain compensated, azimuthally invariant measurement quantity is computed according to at least one of the following mathematical equations:

$$CRXXPYY=TBT(\text{real}(XX_{ij}+YY_{ij}))$$

$$CIXXPYY=TBT(\text{imag}(XX_{ij}+YY_{ij}))$$

wherein CRXXPYY and CIXXPYY represent the gain compensated, azimuthally invariant measurement quantity, $XX_{ij}$ and $YY_{ij}$ represent the voltage measurements expressed as formation dip azimuth and tool eccentering azimuth harmonic functions, $XX_{ij}+YY_{ij}$ comprises matched formation dip azimuth and tool eccentering azimuth harmonic functions, real(·) represents a real component of the matched formation dip azimuth and tool eccentering azimuth harmonic functions, imag(·) represents an imaginary component of the matched formation dip azimuth and tool eccentering azimuth harmonic functions, and TBT(·) represents a computed ratio.

9. The method of claim 1, wherein the gain compensated, azimuthally invariant measurement quantity is related to an xy and a yx coupling.

10. The method of claim 1, wherein the gain compensated, azimuthally invariant measurement quantity is related to a real or an imaginary component of an xy+yx coupling.

11. The method of claim 1, wherein the gain compensated, azimuthally invariant measurement quantity is computed according to at least one of the following mathematical equations:

$$CRXYMYX=TBT(\text{real}(XY_{ij}-YX_{ij}))$$

$$CRXYMYX=TBT(\text{imag}(XY_{ij}-YX_{ij}))$$

wherein CRXYMYX and CRXYMYX represent the gain compensated, azimuthally invariant measurement quantity, $XY_{ij}$ and $YX_{ij}$ represent the voltage measurements expressed as formation dip azimuth and tool eccentering azimuth harmonic functions, $XY_{ij}-YX_{ij}$ represents comprises matched formation dip azimuth and tool eccentering azimuth harmonic functions, real (·) represents a real component of the matched formation dip azimuth and tool eccentering azimuth harmonic functions, imag(·) represents an imaginary component of the matched formation dip azimuth and tool eccentering azimuth harmonic functions, and TBT (·) represents a computed ratio.

12. A method comprising:
(a) operating an electromagnetic logging tool in a wellbore in a subterranean formation, the electromagnetic logging tool including a transmitter axially spaced apart from a receiver, the transmitter including an axial transmitting antenna and at least one transverse transmitting antenna, the receiver including an axial receiving antenna and at least one transverse receiving antenna;
(b) causing the axial transmitting antenna and the at least one transverse transmitting antenna to transmit corresponding electromagnetic waves into the subterranean formation;
(c) using the axial receiving antenna and the at least one transverse receiving antenna to receive voltage measurements corresponding to the electromagnetic waves transmitted in (b), wherein the voltage measurements comprise different coupling voltages;
(d) processing combinations of the different coupling voltages at least in part by matching of formation dip azimuth harmonic functions to compute a gain compensated, azimuthally invariant measurement quantity; and
(e) performing an inversion using at least the gain compensated, azimuthally invariant measurement quantity to compute at least one conductivity value of the subterranean formation.

13. A logging while drilling tool comprising:
a logging while drilling tool body;
at least one transmitter axially spaced apart from at least one receiver on the tool body, the transmitter including an axial transmitting antenna and at least one transverse transmitting antenna, the receiver including an axial receiving antenna and at least one transverse receiving antenna; and
a controller configured to (i) cause the axial transmitting antenna and the at least one transverse transmitting antenna to sequentially transmit corresponding electromagnetic waves; (ii) cause the axial receiving antenna and at least one transverse receiving antenna to receive voltage measurements corresponding to the electromagnetic waves transmitted in (i), wherein the voltage measurements comprise different coupling voltages, and (iii) process combinations of the different coupling voltages at least in part by matching at least one of formation dip azimuth harmonic functions and formation dip azimuth and tool eccentering azimuth harmonic functions to compute at least one gain compensated, azimuthally invariant measurement quantity for inversion to compute at least one conductivity value of a subterranean formation.

14. The logging while drilling tool of claim 13, wherein the at least one gain compensated, azimuthally invariant measurement quantity is azimuthally invariant with respect to at least one of a formation dip azimuth and a tool eccentering azimuth of the logging while drilling tool in a wellbore in the subterranean formation.

15. The logging while drilling tool of claim 13, wherein the at least one gain compensated, azimuthally invariant measurement quantity is azimuthally invariant with respect to both a formation dip azimuth and a tool eccentering azimuth of the logging while drilling tool in a wellbore in the subterranean formation.

16. The logging while drilling tool of claim 13, wherein the at least one gain compensated, azimuthally invariant measurement quantity is related to an xz and a zx coupling or to a yz and a zy coupling.

* * * * *